United States Patent
Feng et al.

(10) Patent No.: US 12,196,600 B2
(45) Date of Patent: Jan. 14, 2025

(54) PIEZOELECTRIC ACOUSTIC SENSOR AND METHOD FOR MANUFACTURE THEREOF

(71) Applicant: HUAWEI TECHNOLOGIES CO., LTD., Guangdong (CN)

(72) Inventors: Zhihong Feng, Wuhan (CN); Danyang Yao, Shenzhen (CN); Jinghui Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 203 days.

(21) Appl. No.: 17/974,326

(22) Filed: Oct. 26, 2022

(65) Prior Publication Data
US 2023/0043470 A1    Feb. 9, 2023

Related U.S. Application Data

(63) Continuation of application No. PCT/CN2021/070491, filed on Jan. 6, 2021.

(30) Foreign Application Priority Data

Apr. 29, 2020    (CN) .......................... 202010357080.1

(51) Int. Cl.
  *G01H 11/08*    (2006.01)
  *H04R 17/02*    (2006.01)
  *H04R 31/00*    (2006.01)
(52) U.S. Cl.
  CPC .............. *G01H 11/08* (2013.01); *H04R 17/02* (2013.01); *H04R 31/006* (2013.01)
(58) Field of Classification Search
  CPC ...... G01H 11/08; H04R 17/02; H04R 31/006; H04R 7/20; H04R 31/00; H04R 2201/003;
(Continued)

(56) References Cited

U.S. PATENT DOCUMENTS 10,277,354 B1    4/2019  Li et al.
2003/0133588 A1*  7/2003  Pedersen .............. H04R 19/005
                                              381/396
(Continued)

FOREIGN PATENT DOCUMENTS

CN    105848076 A    8/2016
CN    108917991 A    11/2018
(Continued)

OTHER PUBLICATIONS

International Search Report and Written Opinion in International Appln. No. PCT/CN2021/070491, mailed on Mar. 18, 2021, 15 pages (with English translation).
(Continued)

*Primary Examiner* — Angelica M McKinney
(74) *Attorney, Agent, or Firm* — Fish & Richardson P.C.

(57) ABSTRACT

This application discloses example piezoelectric acoustic sensors and methods for manufacturing the piezoelectric acoustic sensor, and belongs to the field of electronic technologies. In one example, the piezoelectric acoustic sensor includes an anchoring unit, a piezoelectric unit, a support unit, and a hollow-out mechanical part. A back cavity is formed in the anchoring unit. The piezoelectric unit is configured to convert a sound signal that enters the back cavity into an electrical signal. The support unit covers the anchoring unit and the piezoelectric unit. The hollow-out mechanical part is connected between the anchoring unit and the piezoelectric unit, and is embedded in the support unit.

22 Claims, 17 Drawing Sheets

(58) Field of Classification Search
CPC .... H04R 17/00; H04R 19/005; H04R 17/005;
G01D 5/48; B81C 1/00182; G01P 15/097
See application file for complete search history.

(56) References Cited

U.S. PATENT DOCUMENTS

| | | |
|---|---|---|
| 2007/0287233 A1 | 12/2007 | Zhan et al. |
| 2009/0151455 A1 | 6/2009 | Wu et al. |
| 2010/0156238 A1* | 6/2010 | Kim ................. H04R 17/00 |
| | | 29/25.35 |
| 2011/0064250 A1* | 3/2011 | Jeong ............... H04R 17/00 |
| | | 29/25.35 |
| 2012/0087522 A1* | 4/2012 | Lee .................. H04R 17/005 |
| | | 216/17 |
| 2015/0212109 A1* | 7/2015 | Kang ................. G01P 15/097 |
| | | 73/662 |
| 2016/0014538 A1 | 1/2016 | Dehe |
| 2016/0315247 A1 | 10/2016 | Boser et al. |
| 2017/0215846 A1 | 8/2017 | Sammoura et al. |
| 2019/0193116 A1 | 6/2019 | Horsley et al. |
| 2023/0105699 A1* | 4/2023 | Chen ................. B81C 1/00182 |
| | | 257/414 |

FOREIGN PATENT DOCUMENTS

| | | | | |
|---|---|---|---|---|
| CN | 109990814 A | * | 7/2019 | ............ G01D 5/48 |
| CN | 110896518 | | 3/2020 | |
| CN | 111048660 A | | 4/2020 | |

OTHER PUBLICATIONS

Extended European Search Report in European Appln No. 21796082.2, dated Sep. 1, 2023, 7 pages.

\* cited by examiner

TO

PIEZOELECTRIC ACOUSTIC SENSOR AND METHOD FOR MANUFACTURE THEREOF

CROSS-REFERENCE TO RELATED APPLICATIONS

This application is a continuation of International Application No. PCT/CN2021/070491, filed on Jan. 6, 2021, which claims priority to Chinese Patent Application No. 202010357080.1, filed on Apr. 29, 2020. The disclosures of the aforementioned applications are hereby incorporated by reference in their entireties.

TECHNICAL FIELD

This application relates to the field of electronic technologies, and in particular, to a piezoelectric acoustic sensor and a method for manufacturing the piezoelectric acoustic sensor.

BACKGROUND

With development of electronic technologies, microphones have been deeply rooted in every aspect of people's life, and are widely applied to fields such as mobile phones, smart speakers, wireless Bluetooth earphones, noise reduction headsets, notebook computers, and automobiles. A piezoelectric acoustic sensor may be disposed in a microphone to collect sound, and the piezoelectric acoustic sensor has many advantages such as a high signal-to-noise ratio, low power consumption, and high sensitivity.

The piezoelectric acoustic sensor includes an electrode and a piezoelectric material. When a sound signal causes the piezoelectric material to vibrate, an electric potential difference is generated between an upper electrode and a lower electrode in a stress-concentrated area in the piezoelectric material. In this way, the sound signal may be converted into the electrical signal for extraction.

The piezoelectric acoustic sensor currently adopts a cantilever beam structure, a cantilever beam bends after being pressed by sound pressure, and a bending stress of the cantilever beam generates the electric signal. However, due to impact of a manufacturing process, a residual stress exists in the cantilever beam. This causes warpage of the cantilever beam. In this way, a gap of the cantilever beam is increased, and sound leakage of the piezoelectric acoustic sensor is increased. This affects a resonance frequency and sensitivity of the piezoelectric acoustic sensor.

SUMMARY

This application provides a piezoelectric acoustic sensor and a method for manufacturing the piezoelectric acoustic sensor, to help improve consistency between a resonance frequency and sensitivity of the piezoelectric acoustic sensor.

According to one aspect, a piezoelectric acoustic sensor is provided, where the piezoelectric acoustic sensor includes: an anchoring unit, a piezoelectric unit, a support unit, and a hollow-out mechanical part. A back cavity is formed in the anchoring unit. The piezoelectric unit is configured to convert a sound signal that enters the back cavity into an electrical signal. The support unit covers the anchoring unit and the piezoelectric unit. The hollow-out mechanical part is connected between the anchoring unit and the piezoelectric unit, and is embedded in the support unit.

The anchoring unit is configured to fasten each component in the piezoelectric acoustic sensor, and another component in the piezoelectric acoustic sensor is formed on the anchoring unit. The anchoring unit includes the back cavity, the back cavity includes a sound inlet hole, and the piezoelectric unit is suspended above the back cavity to sense a sound. Optionally, the anchoring unit includes a substrate layer and an insulation layer, and the insulation layer covers the substrate layer.

The piezoelectric unit may be a piezoelectric stacked film, and may include the electrode and the piezoelectric material. The piezoelectric unit may convert mechanical motion into an electrical signal. Specifically, when a sound signal causes the piezoelectric material to vibrate, an electric potential difference is generated between an upper electrode and a lower electrode in a stress-concentrated area in the piezoelectric material. In this way, the sound signal may be converted into the electrical signal for extraction.

The support unit is configured to fasten positions of the anchoring unit, the hollow-out mechanical part, and the piezoelectric unit, to enhance mechanical strength of the piezoelectric acoustic sensor. Because the hollow-out mechanical part is connected between the anchoring unit and the piezoelectric unit, after the support unit covers the anchoring unit and the piezoelectric unit, the support unit wraps the hollow-out mechanical part. In other words, the hollow-out mechanical part is embedded in the support unit. In this way, the support unit fills a hollow-out gap in the hollow-out mechanical part. In this way, an intrinsic resonance frequency of the piezoelectric acoustic sensor may be adjusted, sound leakage caused by the hollow-out gap is reduced, and low-frequency response performance of the piezoelectric acoustic sensor is improved.

The hollow-out mechanical part is a mechanical structure in which some materials are removed, and has low rigidity and is easy to deform. For example, a shape of the hollow-out mechanical part may be a bent shape, a hollow shape, a grid shape, or the like. The hollow-out mechanical part may have a stress release function. To improve a stress release effect, a quantity of hollow-out mechanical parts may be greater than or equal to 2. Further, at least two hollow-out mechanical parts may be evenly distributed around the piezoelectric unit.

In a possible implementation, the piezoelectric unit may be a single piezoelectric wafer, the piezoelectric unit may include the lower electrode, the piezoelectric material, and the upper electrode, and the piezoelectric material is located between the lower electrode and the upper electrode. An upper surface of the piezoelectric unit is completely covered with the support unit. In this way, existence of the support unit may enable a neutral axis of the piezoelectric unit to be far away from a center of the piezoelectric unit (that is, far away from the piezoelectric material), so that charge output and sensitivity of the piezoelectric acoustic sensor can be effectively improved.

In another possible implementation, the piezoelectric unit may be a double piezoelectric wafer, and the piezoelectric unit may include the lower electrode, a first piezoelectric material, a middle electrode, a second piezoelectric material, and the upper electrode. The first piezoelectric material is located between the lower electrode and the middle electrode, and the second piezoelectric material is located between the middle electrode and the upper electrode. An upper surface of the piezoelectric unit is partially covered with the support unit. In this way, it may be ensured that a neutral axis of the piezoelectric unit is located in the middle electrode of the piezoelectric unit, so that charge output and sensitivity of the piezoelectric acoustic sensor are not affected.

Optionally, the hollow-out mechanical part may be connected to at least one of the electrode or the piezoelectric material in the piezoelectric unit. In addition, when the hollow-out mechanical part is connected to the electrode in the piezoelectric unit, the hollow-out mechanical part and the electrode to which the hollow-out mechanical part is connected may use a same material. When the hollow-out mechanical part is connected to the piezoelectric material in the piezoelectric unit, the hollow-out mechanical part and the piezoelectric material to which the hollow-out mechanical part is connected may use a same material. When the hollow-out mechanical part is separately connected to the electrode and the piezoelectric material in the piezoelectric unit, that is, when one part of the hollow-out mechanical part is connected to the electrode in the piezoelectric unit and another part is connected to the piezoelectric material in the piezoelectric unit, a part of the hollow-out mechanical part and the electrode to which the hollow-out mechanical part is connected may use a same material, and the another part of the hollow-out mechanical part and the piezoelectric material to which the hollow-out mechanical part is connected may use a same material. In this case, the hollow-out mechanical part may be a multi-layer structure, each layer of the hollow-out mechanical part may be connected to the electrode or the piezoelectric material, and the electrode or the piezoelectric material connected to each layer of the hollow-out mechanical part uses a same material.

In this way, when the electrode or the piezoelectric material in the piezoelectric unit is manufactured, the hollow-out mechanical part to which the electrode or the piezoelectric material is connected may also be manufactured. This simplifies a manufacturing process, and saves manufacturing costs and manufacturing time.

In this application, in a manufacturing process of the piezoelectric acoustic sensor, a sacrificial layer is usually formed first, then the piezoelectric unit is formed on the sacrificial layer, and then the sacrificial layer is removed. In this case, on one hand, the hollow-out mechanical part may have a mechanical connection function. In a process of removing the sacrificial layer below the piezoelectric unit, the piezoelectric unit may be connected to the anchoring unit by using the hollow-out mechanical part. This may prevent the piezoelectric unit from falling off in the process of removing the sacrificial layer. On the other hand, the hollow-out mechanical part may have a stress release function. In the process of removing the sacrificial layer below the piezoelectric unit, the low-rigidity and deformable hollow-out mechanical part allows the piezoelectric unit to move (for example, bend up and down or extend horizontally) through a change of the hollow-out gap, and a residual stress of the piezoelectric unit is released by the deformable hollow-out mechanical part, to achieve zero residual stress. Since the residual stress of the piezoelectric unit has been released, piezoelectric acoustic sensors of a same geometrical size have a same resonance frequency and sensitivity.

According to another aspect, a method for manufacturing a piezoelectric acoustic sensor is provided. In this method, an anchoring unit is provided, a groove is etched on an upper surface of the anchoring unit, and then a sacrificial layer is filled in the groove. A piezoelectric unit is formed on the sacrificial layer, and a hollow-out mechanical part is formed on the anchoring unit and the sacrificial layer, where an area of a lower surface of the piezoelectric unit is less than an area of an upper surface of the sacrificial layer, and the hollow-out mechanical part is connected between the anchoring unit and the piezoelectric unit. Then, the sacrificial layer is removed. When the piezoelectric unit is in contact with a bottom of the groove, a support unit is formed on the anchoring unit and the piezoelectric unit, and the support unit wraps the hollow-out mechanical part. Finally, a back cavity is etched at a part between the bottom of the groove and a lower surface of the anchoring unit to obtain the piezoelectric acoustic sensor.

The anchoring unit is configured to fasten each component in the piezoelectric acoustic sensor, and another component in the piezoelectric acoustic sensor may be formed on the anchoring unit. The anchoring unit may include a substrate layer and an insulation layer. In this case, when the anchoring unit is provided, the substrate layer may be first provided, and then the insulation layer is formed on the substrate layer.

The piezoelectric unit may be a piezoelectric stacked film, and may include the electrode and the piezoelectric material. The piezoelectric unit may convert mechanical motion into an electrical signal. Specifically, when a sound signal causes the piezoelectric material to vibrate, an electric potential difference is generated between an upper electrode and a lower electrode in a stress-concentrated area in the piezoelectric material. In this way, the sound signal may be converted into the electrical signal for extraction. The area of the lower surface of the piezoelectric unit is less than the area of the upper surface of the sacrificial layer. In other words, the piezoelectric unit is completely located on the upper surface of the sacrificial layer.

The hollow-out mechanical part is a mechanical structure in which some materials are removed, and has low rigidity and is easy to deform. For example, a shape of the hollow-out mechanical part may be a bent shape, a hollow shape, a grid shape, or the like. The hollow-out mechanical part may have a stress release function. To improve a stress release effect, a quantity of hollow-out mechanical parts may be greater than or equal to 2. Further, at least two hollow-out mechanical parts may be evenly distributed around the piezoelectric unit.

The support unit is configured to fasten positions of the anchoring unit, the hollow-out mechanical part, and the piezoelectric unit, to enhance mechanical strength of the piezoelectric acoustic sensor. Because the hollow-out mechanical part is connected between the anchoring unit and the piezoelectric unit, after the support unit is formed on the anchoring unit and the piezoelectric unit, the support unit wraps the hollow-out mechanical part. In other words, the support unit covers the anchoring unit and the piezoelectric unit, and the hollow-out mechanical part is embedded in the support unit. In this way, the support unit fills the hollow-out gap in the hollow-out mechanical part. In this way, an intrinsic resonance frequency of a finally manufactured piezoelectric acoustic sensor may be adjusted, sound leakage caused by the hollow-out gap is reduced, and low-frequency response performance of the piezoelectric acoustic sensor is improved.

In a possible implementation, the piezoelectric unit may be a single piezoelectric wafer, and the piezoelectric unit may include the lower electrode, the piezoelectric material, and the upper electrode. In this case, when the piezoelectric unit is formed above the sacrificial layer, the lower electrode may be formed on the sacrificial layer, the piezoelectric material may be formed on the lower electrode, and the upper electrode may be formed on the piezoelectric material. When the support unit is formed on the anchoring unit and the piezoelectric unit, the support unit may be directly deposited on the upper surface of the anchoring unit and an upper surface of the piezoelectric unit, and the deposited support unit wraps the hollow-out mechanical part.

In this implementation, the upper surface of the piezoelectric unit is completely covered with the support unit. In this way, existence of the support unit may enable a neutral axis of the piezoelectric unit to be far away from a center of the piezoelectric unit (that is, far away from the piezoelectric material), so that charge output and sensitivity of the finally manufactured piezoelectric acoustic sensor can be effectively improved.

In another possible implementation, the piezoelectric unit may be a double piezoelectric wafer, and the piezoelectric unit may include the lower electrode, a first piezoelectric material, a middle electrode, a second piezoelectric material, and the upper electrode. In this case, when the piezoelectric unit is formed on the sacrificial layer, the lower electrode may be formed on the sacrificial layer, the first piezoelectric material may be formed on the lower electrode, the middle electrode may be formed on the first piezoelectric material, the second piezoelectric material may be formed on the middle electrode, and the second piezoelectric material may be formed on the upper electrode. When the support unit is formed on the anchoring unit and the piezoelectric unit, the support unit may be first deposited on the upper surface of the anchoring unit and the upper surface of the piezoelectric unit, the deposited support unit wraps the hollow-out mechanical part, and at least a part of the support unit deposited on the upper surface of the piezoelectric unit is then removed.

In this implementation, the upper surface of the piezoelectric unit is partially covered with the support unit. In this way, it may be ensured that the neutral axis of the piezoelectric unit is located in the middle electrode of the piezoelectric unit, so that charge output and sensitivity of the finally manufactured piezoelectric acoustic sensor are not affected.

Optionally, the hollow-out mechanical part may be connected to at least one of the electrode or the piezoelectric material in the piezoelectric unit. In addition, when the hollow-out mechanical part is connected to the electrode in the piezoelectric unit, the hollow-out mechanical part and the electrode to which the hollow-out mechanical part is connected may use a same material. When the hollow-out mechanical part is connected to the piezoelectric material in the piezoelectric unit, the hollow-out mechanical part and the piezoelectric material to which the hollow-out mechanical part is connected may use a same material. When the hollow-out mechanical part is separately connected to the electrode and the piezoelectric material in the piezoelectric unit, that is, when one part of the hollow-out mechanical part is connected to the electrode in the piezoelectric unit and another part is connected to the piezoelectric material in the piezoelectric unit, a part of the hollow-out mechanical part and the electrode to which the hollow-out mechanical part is connected may use a same material, and the another part of the hollow-out mechanical part and the piezoelectric material to which the hollow-out mechanical part is connected may use a same material. In this case, the hollow-out mechanical part may be a multi-layer structure, each layer of the hollow-out mechanical part may be connected to the electrode or the piezoelectric material, and the electrode or the piezoelectric material connected to each layer of the hollow-out mechanical part uses a same material.

In this way, when the electrode or the piezoelectric material in the piezoelectric unit is manufactured, the hollow-out mechanical part to which the electrode or the piezoelectric material is connected may also be manufactured. This simplifies a manufacturing process, and saves manufacturing costs and manufacturing time.

In this application, on one hand, the hollow-out mechanical part may have a mechanical connection function. In a process of removing the sacrificial layer below the piezoelectric unit, the piezoelectric unit may be connected to the anchoring unit by using the hollow-out mechanical part. This may prevent the piezoelectric unit from falling off in the process of removing the sacrificial layer. In this case, the piezoelectric unit may be suspended above the groove by using the hollow-out mechanical part. On the other hand, the hollow-out mechanical part may have a stress release function. In the process of removing the sacrificial layer below the piezoelectric unit, the low-rigidity and deformable hollow-out mechanical part allows the piezoelectric unit to move (for example, bend up and down or extend horizontally) through a change of the hollow-out gap, and a residual stress of the piezoelectric unit is released by the deformable hollow-out mechanical part, to achieve zero residual stress. Since the residual stress of the piezoelectric unit has been released, piezoelectric acoustic sensors of a same geometrical size that are finally fabricated have a same resonance frequency and sensitivity.

The technical solutions provided in this application may bring at least the following beneficial effects.

The piezoelectric acoustic sensor includes the anchoring unit, the piezoelectric unit, the support unit, and the hollow-out mechanical part. A back cavity is formed in the anchoring unit. The piezoelectric unit is configured to convert a sound signal that enters the back cavity into an electrical signal. The support unit covers the anchoring unit and the piezoelectric unit. The hollow-out mechanical part is connected between the anchoring unit and the piezoelectric unit, and is embedded in the support unit. The residual stress of the piezoelectric unit may be released by using the deformable hollow-out mechanical part in the manufacturing process, to achieve zero residual stress. Therefore, this can avoid resonance frequency drift of the piezoelectric acoustic sensor, avoid sensitivity reduction of the piezoelectric acoustic sensor, and further help improve performance consistency of the piezoelectric acoustic sensor.

REFERENCE NUMERALS

Figure 1:
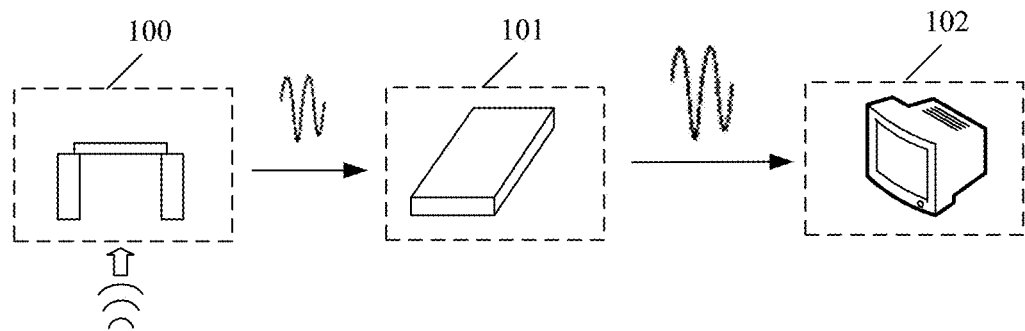
FIG. 1 is a schematic diagram of a sound pickup system according to an embodiment of this application.

1: anchoring unit; 2: piezoelectric unit; 21: lower electrode; 22: piezoelectric material; 221: first piezoelectric material; 222: second piezoelectric material; 23: upper electrode; 24: middle electrode; 3: support unit; 4: hollow-out mechanical part; 5: back cavity; 6: groove, and 7: sacrificial layer.

DESCRIPTION OF EMBODIMENTS

To make the objectives, technical solutions, and advantages of this application clearer, the following further describes embodiments of this application in detail with reference to the accompanying drawings.

Before embodiments of this application are described in detail, application scenarios in embodiments of this application are first described.

A microphone is an acoustic-electric energy conversion device that converts a sound signal into an electrical signal. Microphones are widely applied in mobile phones, noise reduction headsets, wireless Bluetooth earphones, smart speakers, and the like. Microphones are deeply rooted in every aspect of people's life. The following uses a mobile phone and a smart speaker as examples to describe an application of a microphone.

With rapid development of Internet technologies, a mobile phone has more functions and a higher integration level. Generally, a mobile phone has two microphones for sound pickup. One of the two microphones is a primary microphone, and is configured to pick up voice of a call. The other microphone is configured to pick up a background sound, and is usually installed on the back of the mobile phone and far away from the primary microphone. The two microphones are internally isolated by a mainboard. This design may effectively resist ambient noise interference around the mobile phone and greatly improve a quality of the call. In addition to the two microphones, another microphone may be disposed in the mobile phone. For example, a microphone may be disposed beside a rear-facing camera, so that sounds in different directions may be more easily received when a video is recorded by using the rear-facing camera. Certainly, a microphone may also be disposed beside the front-facing camera, so that sounds in different directions may be better picked up when a video is recorded by using the front-facing camera.

With emergence of the Internet of Things (IoT), smart home is becoming increasingly popular in daily life. Intelligent control has been applied to televisions, refrigerators, air conditioners, fans, and lights and other equipment. How to control these devices has become a topic of general concern. After independent remote control, built-in remote control of the mobile phone, and third-party remote control are experimented, the smart speaker can finally be controlled by voice. A microphone array including a plurality of microphones is disposed in the smart speaker. The microphone array may implement functions such as voice quality enhancement, acoustic source localization, dereverberation, and acoustic source signal extraction (separation). This makes it possible to perform voice control in a complex environment.

Piezoelectric microphones (namely, piezoelectric MEMS microphones) based on micro-electro-mechanical systems (MEMS) are widely used because of their advantages such as miniaturization, batch production and high performance. A piezoelectric acoustic sensor may be disposed in the piezoelectric MEMS microphones to collect sound, and the piezoelectric acoustic sensor has many advantages such as a high signal-to-noise ratio, low power consumption, and high sensitivity.

As electronic devices such as mobile phones and smart speakers have increasing requirements for directional sound pickup, more microphones need to be disposed in the electronic devices. To ensure a directional sound pickup effect, performance consistency of microphones in the electronic device needs to be maintained. In other words, performance consistency of piezoelectric acoustic sensors needs to be maintained.

However, a manufacturing process of the piezoelectric acoustic sensors has non-uniformity. Therefore, this results in that residual stresses of manufactured piezoelectric acoustic sensors cannot be consistent. Consequently, resonance frequencies of the piezoelectric acoustic sensors are inconsistent, and even sensitivity of the piezoelectric acoustic sensors is inconsistent. This further causes output response performance of the piezoelectric acoustic sensors to be inconsistent.

Therefore, an embodiment of this application provides a piezoelectric acoustic sensor, and a hollow-out mechanical part is designed, so that problems such as resonance frequency drift and sensitivity reduction caused by a residual stress can be solved, and performance consistency of the piezoelectric acoustic sensor can be improved.

The piezoelectric acoustic sensor provided in embodiments of this application is mainly applied to fields such as mobile phones, smart speakers, wireless Bluetooth headsets, noise reduction headsets, notebook computers, and automobiles, and is used as a sound pickup component. The piezoelectric acoustic sensor is mainly configured to restore a human voice or an ambient sound. For example, the piezoelectric acoustic sensor may complete human voice collection during a call of a mobile phone. For another example, a plurality of piezoelectric acoustic sensors may form an array to implement directional sound pickup of a smart speaker.

FIG. 1 is a schematic diagram of a sound pickup system according to an embodiment of this application. As shown in FIG. 1, the sound pickup system includes a piezoelectric acoustic sensor 100 and an amplification circuit 101. The piezoelectric acoustic sensor 100 may sense a sound, and convert a vibrating sound signal into an original electrical signal. Because the original electrical signal is weak and cannot be directly used, the amplification circuit 101 generally amplifies the original electrical signal, and the amplified electrical signal enters an audio system 102 for processing.

Figure 2:
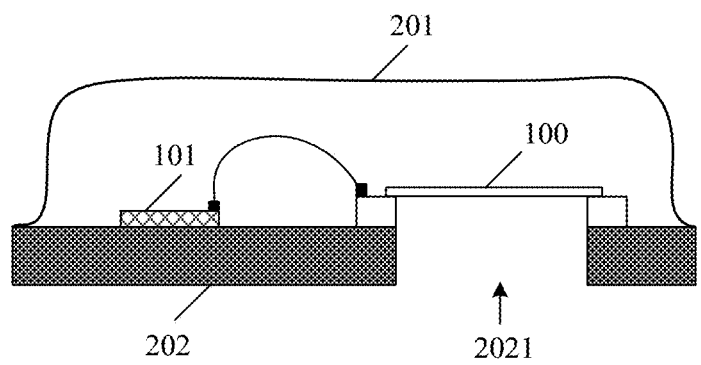
FIG. 2 is a schematic diagram of another sound pickup system according to an embodiment of this application.
Figure 3:
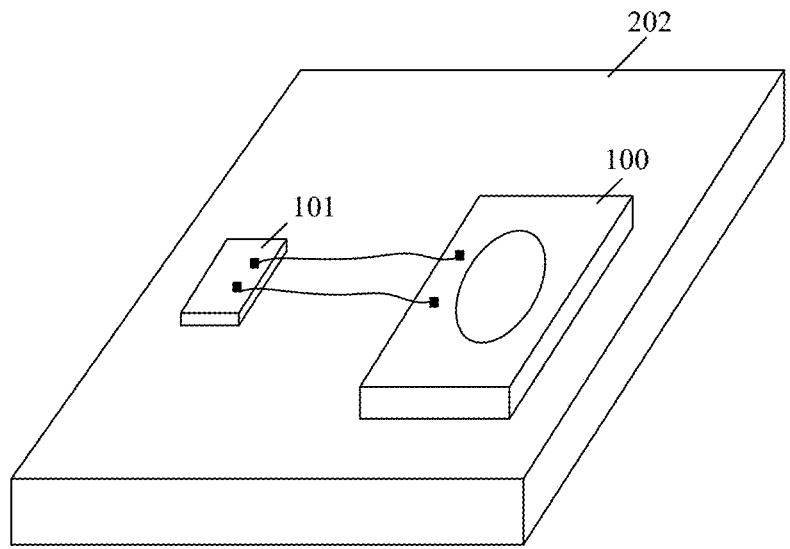
FIG. 3 is a schematic diagram of still another sound pickup system according to an embodiment of this application.

As shown in FIG. 2 and FIG. 3 (a metal housing 201 is not shown), the sound pickup system may be a closed sound cavity including the metal housing 201 and a printed circuit board (PCB)/ceramic board 202. On the PCB/ceramic board 202, the piezoelectric acoustic sensor 100 and the amplification circuit 101 (including but not limited to an application-specific integrated circuit (ASIC) chip) are arranged. The PCB/ceramic board 202 has a sound inlet hole 2021, so that sound vibration may be transmitted to the piezoelectric acoustic sensor 100. The piezoelectric acoustic sensor 100 is electrically connected to the amplification circuit 101 by using a lead. An acoustic electrical signal collected by the piezoelectric acoustic sensor 100 may be amplified by the amplification circuit 101 and then provided to the audio system 102 for processing.

Figure 4:
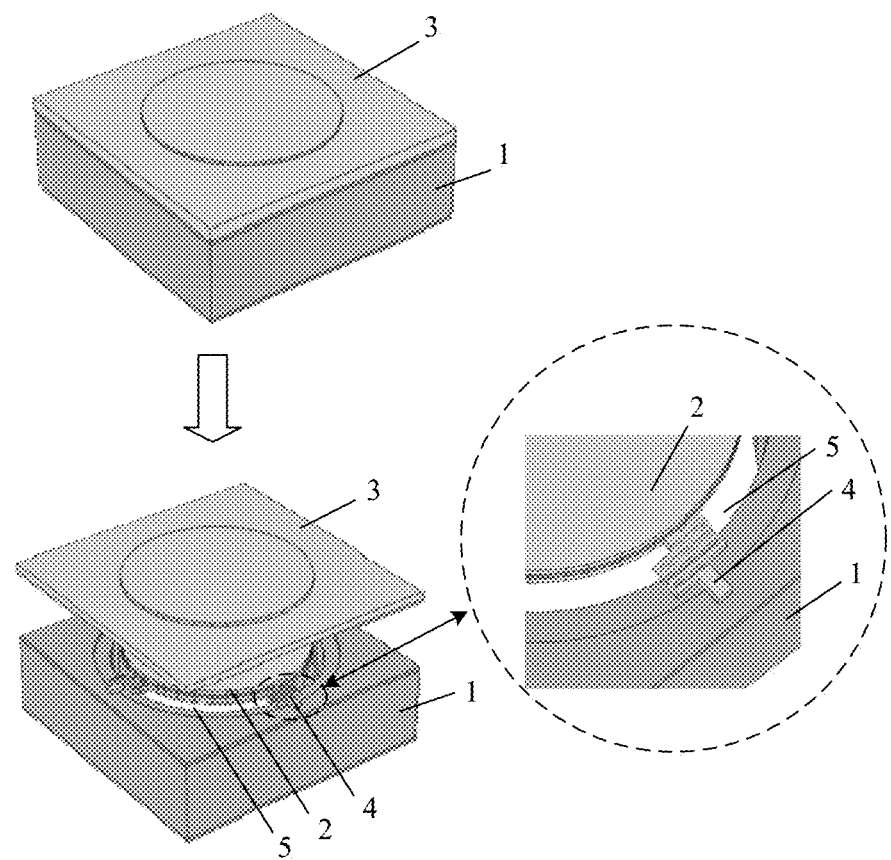
FIG. 4 is a schematic diagram of a structure of a first piezoelectric acoustic sensor according to an embodiment of this application.
Figure 5:
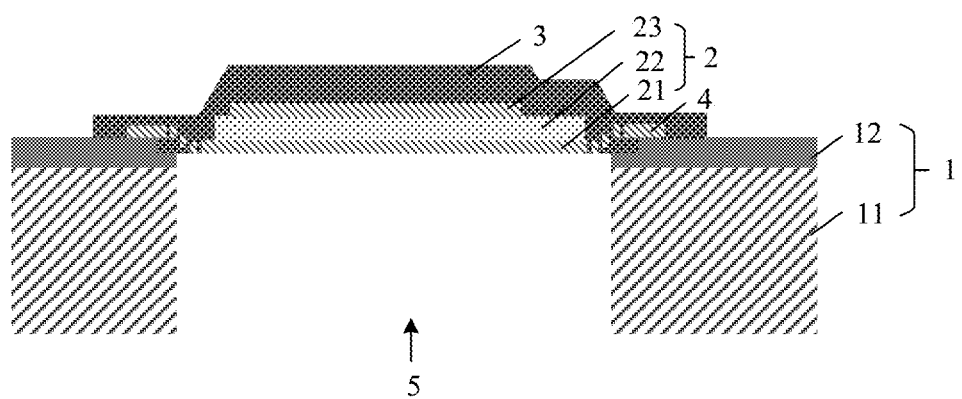
FIG. 5 is a schematic diagram of a structure of a second piezoelectric acoustic sensor according to an embodiment of this application.
Figure 6:
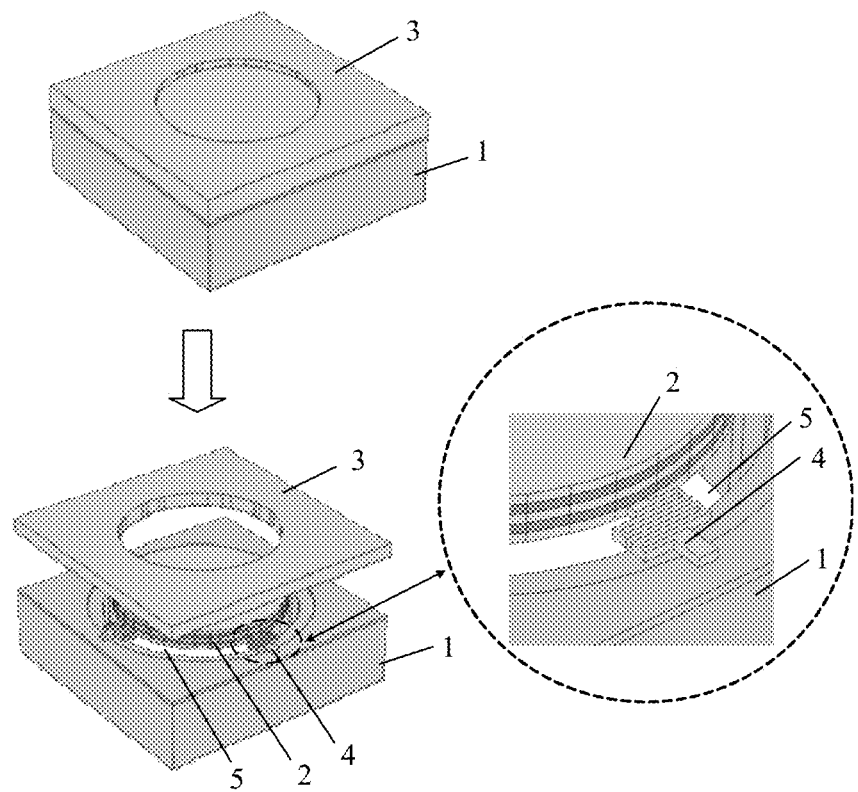
FIG. 6 is a schematic diagram of a structure of a third piezoelectric acoustic sensor according to an embodiment of this application.
Figure 7:
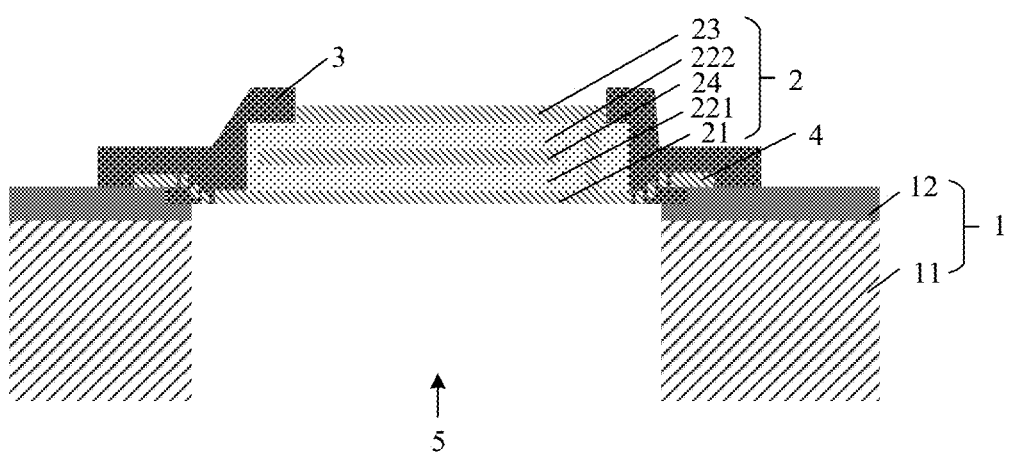
FIG. 7 is a schematic diagram of a structure of a fourth piezoelectric acoustic sensor according to an embodiment of this application.

FIG. 4, FIG. 5, FIG. 6, or FIG. 7 is a schematic diagram of a structure of a piezoelectric acoustic sensor according to an embodiment of this application. FIG. 5 is specifically a sectional view of the piezoelectric acoustic sensor shown in FIG. 4, and FIG. 7 is specifically a sectional view of the piezoelectric acoustic sensor shown in FIG. 6. Refer to FIG. 4 to FIG. 7. The piezoelectric acoustic sensor includes an anchoring unit 1, a piezoelectric unit 2, a support unit 3, and a hollow-out mechanical part 4.

A back cavity 5 is formed in the anchoring unit 1. The piezoelectric unit 2 is configured to convert a sound signal that enters the back cavity 5 into an electrical signal. The support unit 3 covers the anchoring unit 1 and the piezoelectric unit 2. The hollow-out mechanical part 4 is connected between the anchoring unit 1 and the piezoelectric unit 2, and is embedded in the support unit 3.

The following separately describes the anchoring unit 1, the piezoelectric unit 2, the support unit 3, and the hollow-out mechanical part 4.

The anchoring unit 1 is configured to fasten each component in the piezoelectric acoustic sensor, and another component in the piezoelectric acoustic sensor is formed on the anchoring unit 1. The anchoring unit 1 includes the back cavity 5, and the back cavity 5 is a sound inlet hole. The piezoelectric unit 2 is suspended above the back cavity 5, and may convert a sound signal that enters the back cavity 5 into an electrical signal.

The anchoring unit 1 may include a substrate layer 11 and an insulation layer 12, and the insulation layer 12 covers the substrate layer 11. A material of the substrate layer 11 may be silicon, quartz, silicon-on-insulator (SOI), silicon carbide (SiC), or the like. A material of the insulation layer 12 may be silicon nitride or another dielectric material.

The piezoelectric unit 2 may be a piezoelectric stacked film, and may include the electrode and the piezoelectric material. A material of the electrode may be molybdenum, titanium, platinum, aluminum, or the like, and the piezoelectric material may be aluminum nitride, aluminum scandium nitride, lead zirconate titanate, or the like. The piezoelectric unit 2 may convert mechanical motion into an electrical signal. Specifically, when a sound signal causes the piezoelectric material to vibrate, an electric potential difference is generated between an upper electrode and a lower electrode in a stress-concentrated area in the piezoelectric material. In this way, the sound signal may be converted into the electrical signal for extraction.

In addition, a shape of the piezoelectric unit 2 may be set based on an actual requirement. For example, as shown in FIG. 4 or FIG. 6, the piezoelectric unit 2 may be a circle. Alternatively, as shown in FIG. 8 or FIG. 9, the piezoelectric unit 2 may be a polygon.

Figure 8:
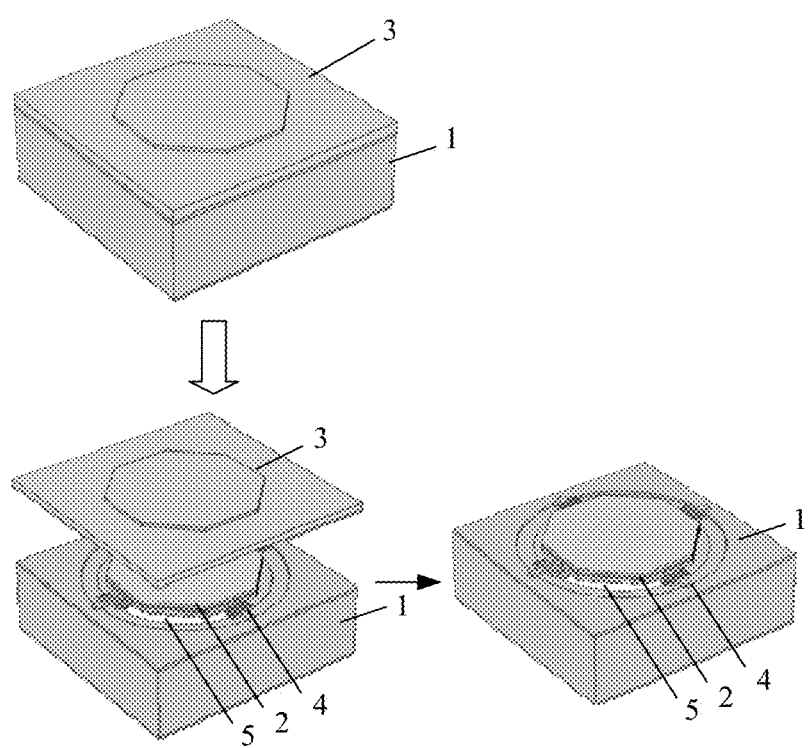
FIG. 8 is a schematic diagram of a structure of a fifth piezoelectric acoustic sensor according to an embodiment of this application.

In a possible implementation, as shown in FIG. 4, FIG. 5, or FIG. 8, the piezoelectric unit 2 may be a single piezoelectric wafer, and the piezoelectric unit 2 may include a lower electrode 21, a piezoelectric material 22, and an upper electrode 23. The piezoelectric material 22 is located between the lower electrode 21 and the upper electrode 23.

Figure 9:
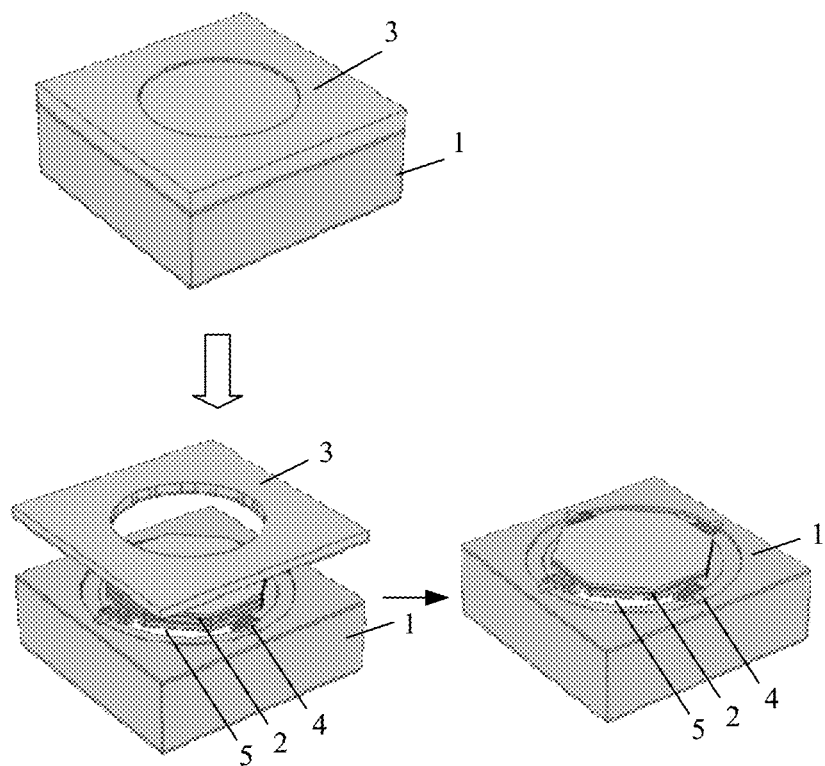
FIG. 9 is a schematic diagram of a structure of a sixth piezoelectric acoustic sensor according to an embodiment of this application.

In another possible implementation, as shown in FIG. 6, FIG. 7, or FIG. 9, the piezoelectric unit 2 may be a double piezoelectric wafer, and the piezoelectric unit 2 may include the lower electrode 21, a first piezoelectric material 221, a middle electrode 24, a second piezoelectric material 222, and the upper electrode 23. The first piezoelectric material 221 is located between the lower electrode 21 and the middle electrode 24, and the second piezoelectric material 222 is located between the middle electrode 24 and the upper electrode 23.

The support unit 3 is configured to fasten positions of the anchoring unit 1, the hollow-out mechanical part 4, and the piezoelectric unit 2, to enhance mechanical strength of the piezoelectric acoustic sensor. A material of the support unit 3 may be polycrystalline silicon, silicon nitride, silicon dioxide, or the like.

In addition, because the hollow-out mechanical part 4 is connected between the anchoring unit 1 and the piezoelectric unit 2, after the support unit 3 covers the anchoring unit 1 and the piezoelectric unit 2, the support unit 3 wraps the hollow-out mechanical part 4. In other words, the hollow-out mechanical part 4 is embedded in the support unit 3. In this way, the support unit 3 implements fastening positions of the anchoring unit 1, the hollow-out mechanical part 4, and the piezoelectric unit 2.

In addition, the hollow-out mechanical part 4 is embedded in the support unit 3, that is, the support unit 3 fills a hollow-out gap in the hollow-out mechanical part 4. In this way, an intrinsic resonance frequency of the piezoelectric acoustic sensor may be adjusted, sound leakage caused by the hollow-out gap is reduced, and low-frequency response performance of the piezoelectric acoustic sensor is improved.

In a possible case, as shown in FIG. 4, FIG. 5, or FIG. 8, when the piezoelectric unit 2 is a single piezoelectric wafer, an upper surface of the piezoelectric unit 2 is completely covered with the support unit 3.

Figure 10:
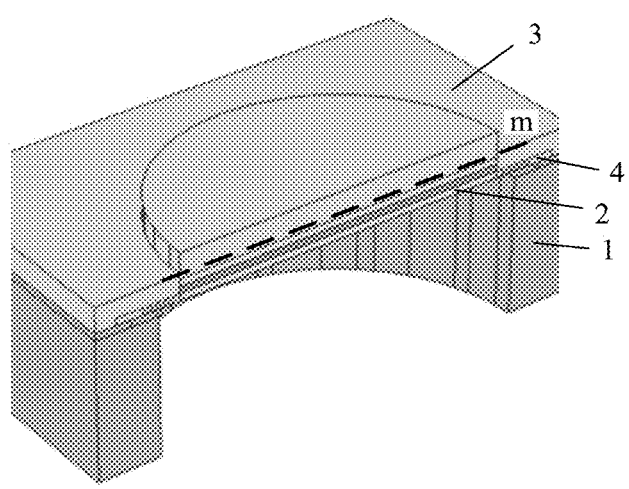
FIG. 10 is a schematic diagram of a neutral axis of a piezoelectric unit according to an embodiment of this application.

In this case, as shown in FIG. 10, existence of the support unit 3 may enable a neutral axis m of the piezoelectric unit 2 to be far away from a center of the piezoelectric unit 2 (that is, far away from the piezoelectric material 22), so that charge output and sensitivity of the piezoelectric acoustic sensor can be effectively improved.

In another possible case, as shown in FIG. 6, FIG. 7, or FIG. 9, the piezoelectric unit 2 is a double piezoelectric wafer, and an upper surface of the piezoelectric unit 2 is partially covered with the support unit 3. For example, an edge part of the upper surface of the piezoelectric unit 2 is covered with the support unit 3, and a central part of the upper surface of the piezoelectric unit 2 is not covered with the support unit 3. In other words, a central area of a part of the support unit 3 that is located above the piezoelectric unit 2 is hollowed out.

Figure 11:
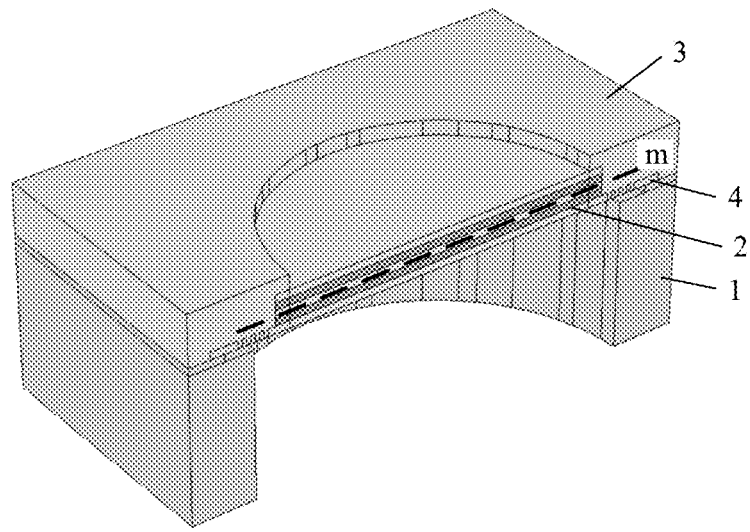
FIG. 11 is a schematic diagram of a neutral axis of another piezoelectric unit according to an embodiment of this application.

In this case, as shown in FIG. 11, it may be ensured that the neutral axis m of the piezoelectric unit 2 is located in the middle electrode 24 of the piezoelectric unit 2, so that charge output and sensitivity of the piezoelectric acoustic sensor are not affected.

Figure 12:
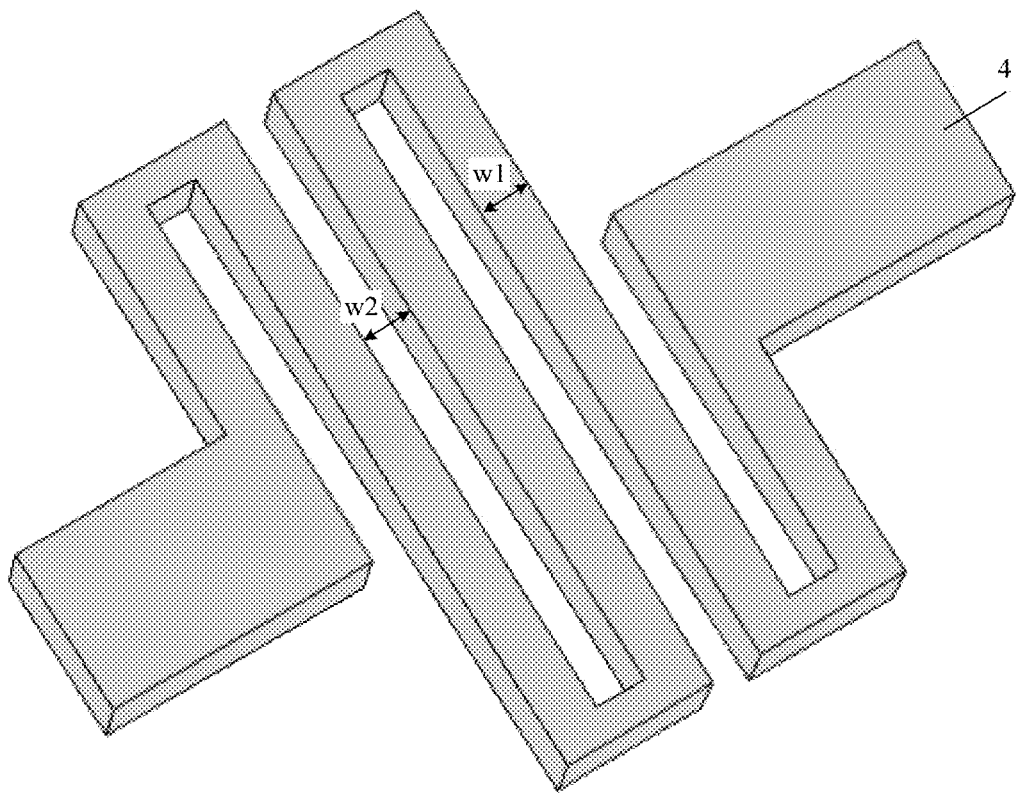
FIG. 12 is a schematic diagram of a structure of a hollow-out mechanical part according to an embodiment of this application.
Figure 13:
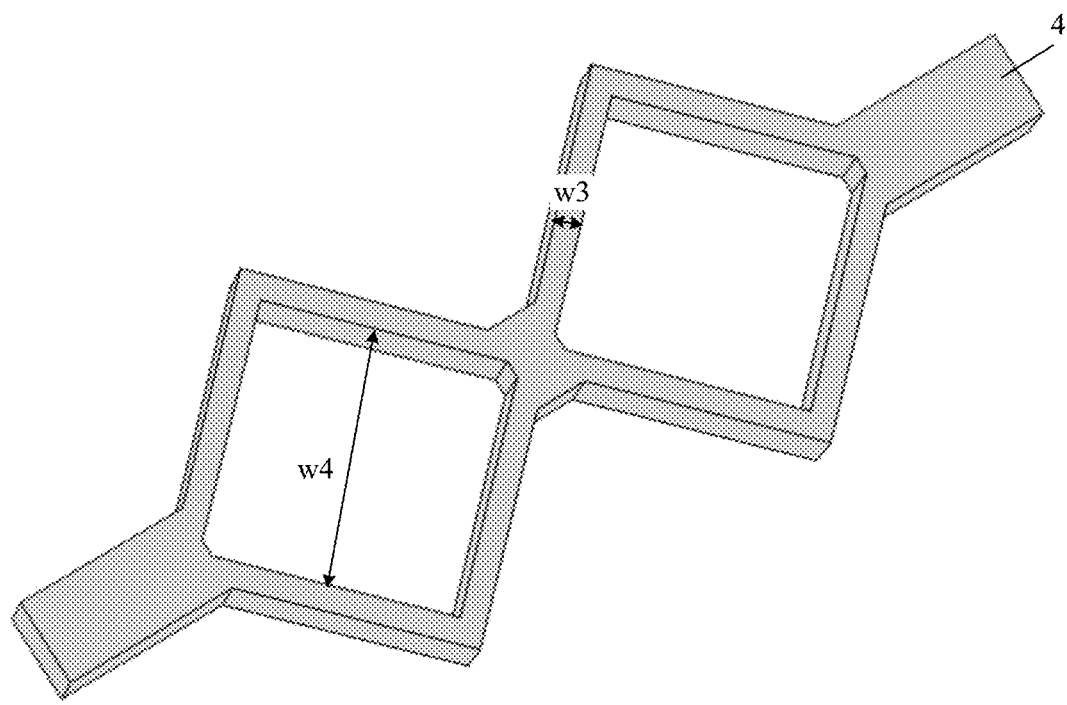
FIG. 13 is a schematic diagram of a structure of another hollow-out mechanical part according to an embodiment of this application.
Figure 14:
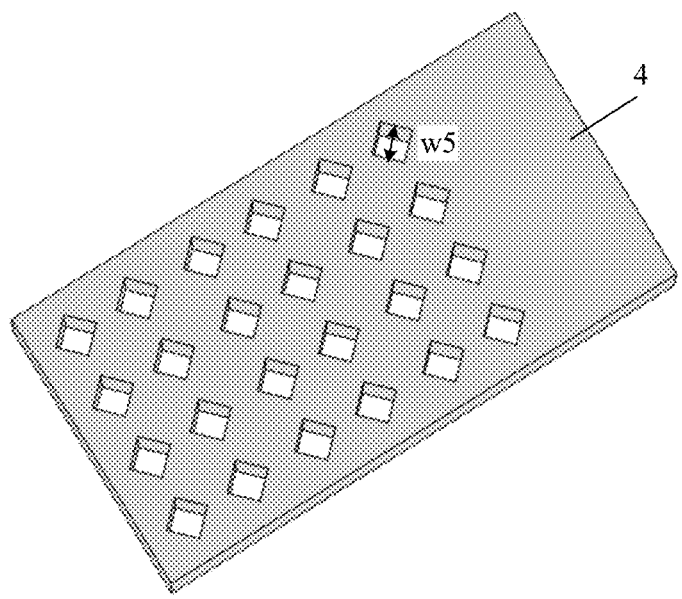
FIG. 14 is a schematic diagram of a structure of still another hollow-out mechanical part according to an embodiment of this application.

The hollow-out mechanical part 4 is a mechanical structure in which some materials are removed, and has low rigidity and is easy to deform. For example, as shown in FIG. 12, a shape of the hollow-out mechanical part 4 may be a bent shape, a width w1 of a bent part of the bent-shaped hollow-out mechanical part 4 may be from 1 to 10 micrometers, and a width w2 of a gap between bent parts may be greater than 0.5 micrometers. Alternatively, as shown in FIG. 13, a shape of the hollow-out mechanical part 4 may be a hollow shape, a width w3 of a hollow-shaped part of the hollow-shaped hollow-out mechanical part 4 may be from 1 to 10 micrometers, and a width w4 of a hollow-out area may be greater than 2 micrometers. Alternatively, as shown in FIG. 14, a shape of the hollow-out mechanical part 4 may be a grid shape, and a width w5 of a hollow-out area of the grid-shaped hollow-out mechanical part 4 may be greater than 1 micrometer.

It should be noted that the hollow-out mechanical part 4 is connected between the anchoring unit 1 and the piezoelectric unit 2. In other words, a first end of the hollow-out mechanical part 4 may be fastened to an upper surface of the anchoring unit 1 (that is, an upper surface of the insulation layer 12), and a second end of the hollow-out mechanical part 4 may be connected to the piezoelectric unit 2.

Figure 15:
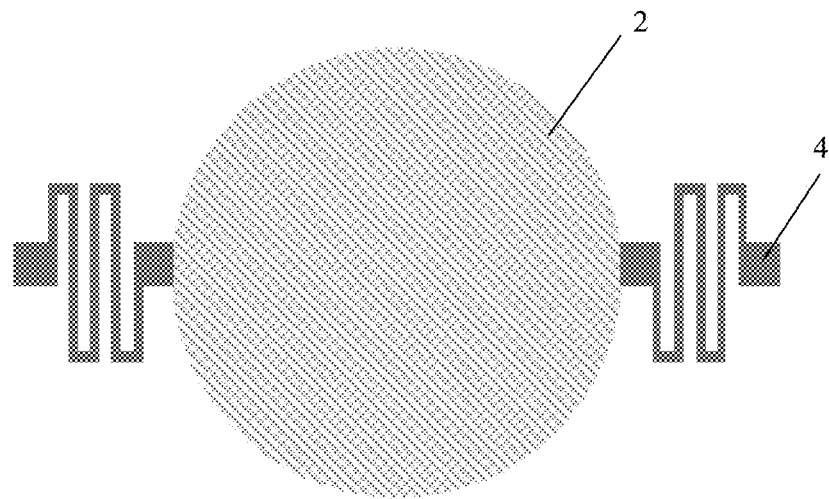
FIG. 15 is a schematic diagram of a connection between a hollow-out mechanical part and a piezoelectric unit according to an embodiment of this application.
Figure 16:
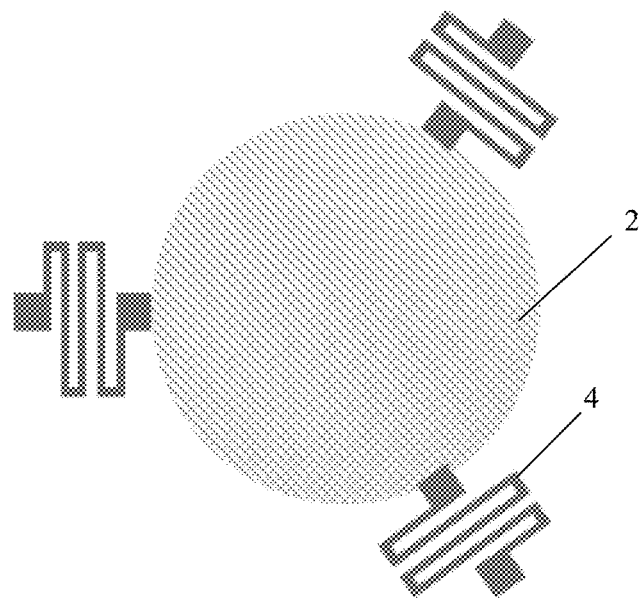
FIG. 16 is another schematic diagram of a connection between a hollow-out mechanical part and a piezoelectric unit according to an embodiment of this application.
Figure 17:
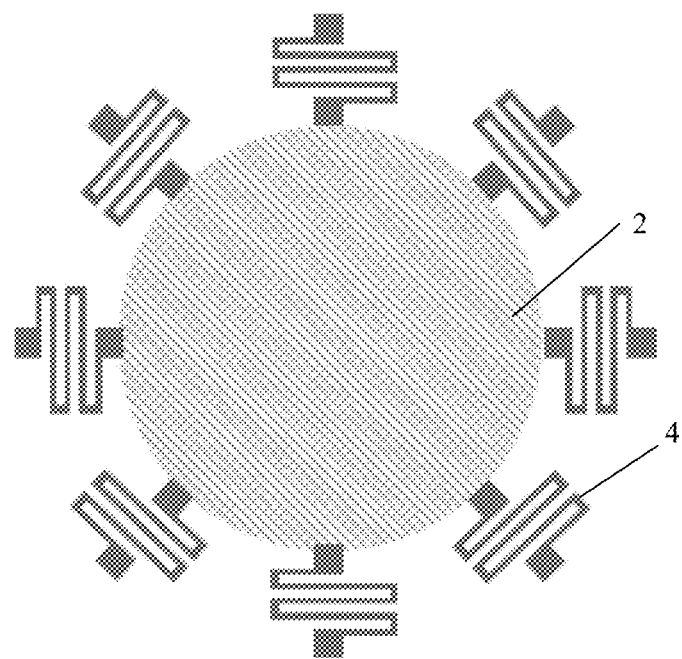
FIG. 17 is still another schematic diagram of a connection between a hollow-out mechanical part and a piezoelectric unit according to an embodiment of this application.

In addition, the hollow-out mechanical part 4 may have a stress release function. A quantity of hollow-out mechanical parts 4 may be set based on a use requirement. To improve a stress release effect, the quantity of hollow-out mechanical parts 4 may be greater than or equal to 2. Further, at least two hollow-out mechanical parts 4 may be evenly distributed around the piezoelectric unit 2. For example, as shown in FIG. 15, there may be two hollow-out mechanical parts 4, and the two hollow-out mechanical parts 4 may be evenly distributed around the piezoelectric unit 2. Alternatively, as shown in FIG. 16, there may be three hollow-out mechanical parts 4, and the three hollow-out mechanical parts 4 may be evenly distributed around the piezoelectric unit 2. Alternatively, as shown in FIG. 17, there may be eight hollow-out mechanical parts 4, and the eight hollow-out mechanical parts 4 may be evenly distributed around the piezoelectric unit 2.

The hollow-out mechanical part 4 may be connected to at least one of the electrode or the piezoelectric material in the piezoelectric unit 2. In addition, when the hollow-out mechanical part 4 is connected to the electrode in the piezoelectric unit 2, the hollow-out mechanical part 4 and the electrode to which the hollow-out mechanical part 4 is connected may use a same material. When the hollow-out mechanical part 4 is connected to the piezoelectric material in the piezoelectric unit 2, the hollow-out mechanical part 4 and the piezoelectric material to which the hollow-out mechanical part 4 is connected may use a same material. When the hollow-out mechanical part 4 is separately connected to the electrode and the piezoelectric material in the piezoelectric unit 2, that is, when one part of the hollow-out mechanical part 4 is connected to the electrode in the piezoelectric unit 2 and another part is connected to the piezoelectric material in the piezoelectric unit 2, a part of the hollow-out mechanical part 4 and the electrode to which the hollow-out mechanical part 4 is connected may use a same material, and the another part of the hollow-out mechanical part 4 and the piezoelectric material to which the hollow-out mechanical part 4 is connected may use a same material. In this case, the hollow-out mechanical part 4 may be a multi-layer structure, each layer of the hollow-out mechanical part 4 may be connected to the electrode or the piezoelectric material, and the electrode or the piezoelectric material connected to each layer of the hollow-out mechanical part 4 uses a same material.

In this way, when the electrode or the piezoelectric material in the piezoelectric unit 2 is manufactured, the hollow-out mechanical part 4 to which the electrode or the piezoelectric material is connected may also be manufactured. This simplifies a manufacturing process, and saves manufacturing costs and manufacturing time.

In a possible implementation, in the piezoelectric unit 2 shown in FIG. 4, FIG. 5, or FIG. 8, that is, when the piezoelectric unit 2 includes three parts: the lower electrode 21, the piezoelectric material 22, and the upper electrode 23, the hollow-out mechanical part 4 may be connected to any one of the three parts. In addition, when a quantity of hollow-out mechanical parts 4 is greater than or equal to 2, at least two hollow-out mechanical parts 4 may be connected to one part of the piezoelectric unit 2, or each hollow-out mechanical part 4 may be connected to a different part of the piezoelectric unit 2.

Figure 18:
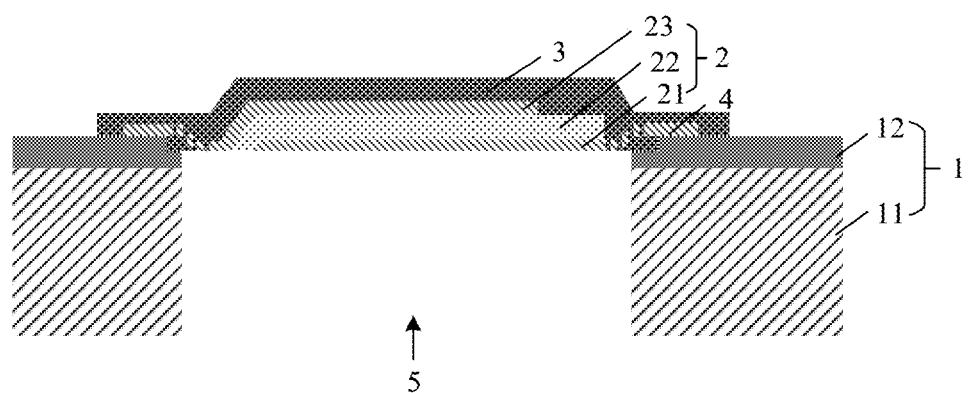
FIG. 18 is a schematic diagram of a structure of a seventh piezoelectric acoustic sensor according to an embodiment of this application.

For example, as shown in FIG. 5, the at least two hollow-out mechanical parts 4 are all connected to the lower electrode 21 in the piezoelectric unit 2. Alternatively, as shown in FIG. 18, at least one hollow-out mechanical part 4 in the at least two hollow-out mechanical parts 4 is connected to the upper electrode 23 in the piezoelectric unit 2, and another hollow-out mechanical part 4 is connected to the lower electrode 21 in the piezoelectric unit 2.

In another possible implementation, in the piezoelectric unit 2 shown in FIG. 6, FIG. 7, or FIG. 9, that is, when the piezoelectric unit 2 includes five parts: the lower electrode 21, the first piezoelectric material 221, the middle electrode 24, the second piezoelectric material 222, and the upper electrode 23, the hollow-out mechanical part 4 may be connected to any one of the five parts. In addition, when a quantity of hollow-out mechanical parts 4 is greater than or equal to 2, at least two hollow-out mechanical parts 4 may be connected to one part of the piezoelectric unit 2, or each hollow-out mechanical part 4 may be connected to a different part of the piezoelectric unit 2.

Figure 19:
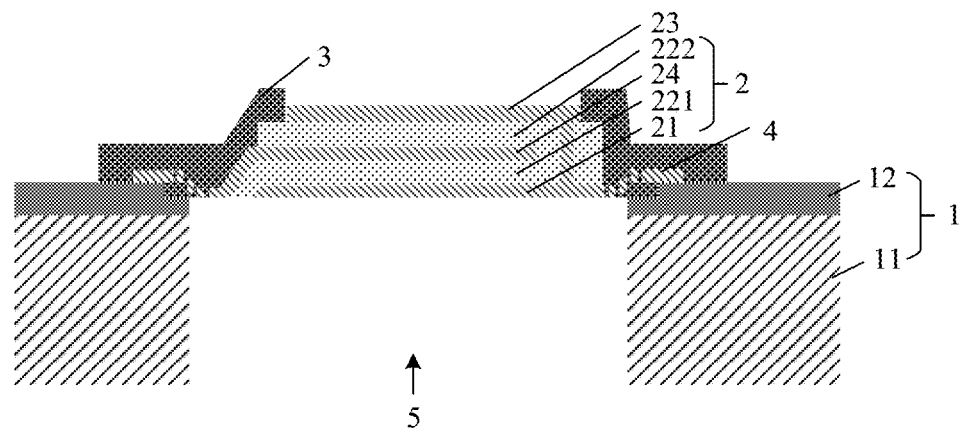
FIG. 19 is a schematic diagram of a structure of an eighth piezoelectric acoustic sensor according to an embodiment of this application.
Figure 20:
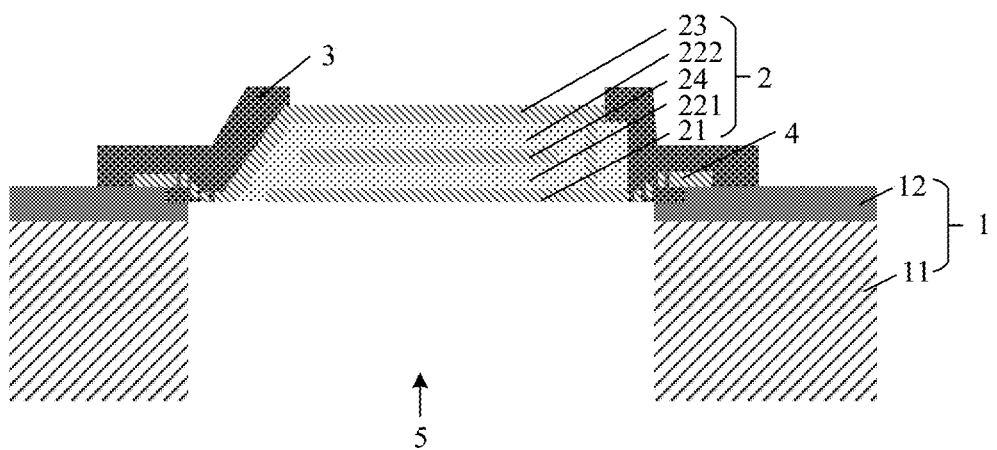
FIG. 20 is a schematic diagram of a structure of a ninth piezoelectric acoustic sensor according to an embodiment of this application.
Figure 21:
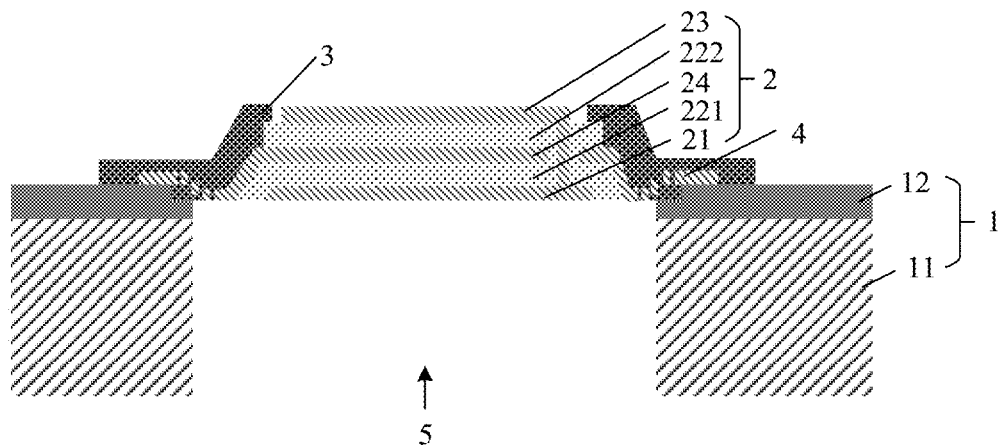
FIG. 21 is a schematic diagram of a structure of a tenth piezoelectric acoustic sensor according to an embodiment of this application.
Figure 22:
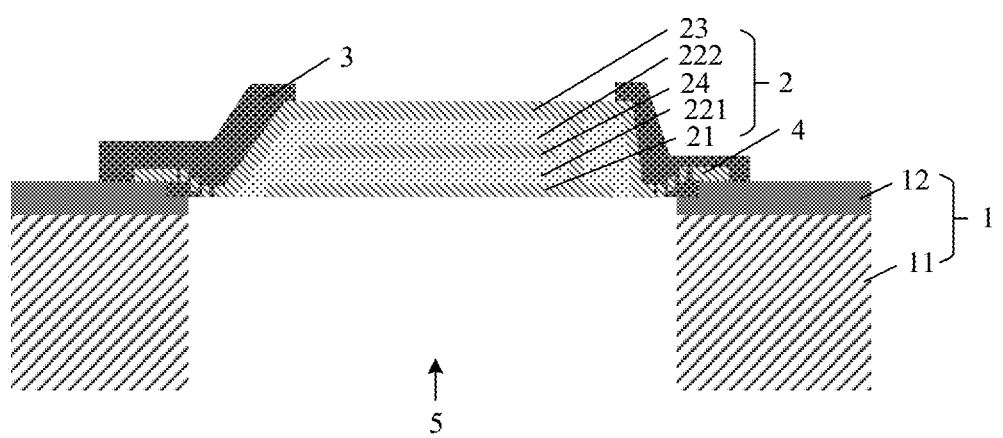
FIG. 22 is a schematic diagram of a structure of an eleventh piezoelectric acoustic sensor according to an embodiment of this application.
Figure 23:
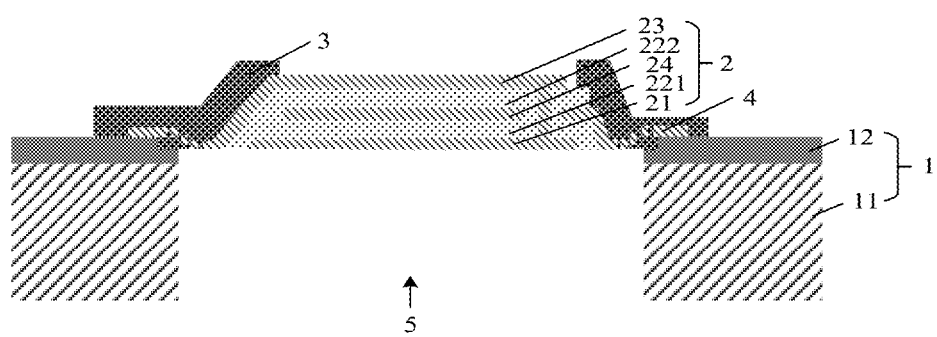
FIG. 23 is a schematic diagram of a structure of a twelfth piezoelectric acoustic sensor according to an embodiment of this application.

For example, as shown in FIG. 7, the at least two hollow-out mechanical parts 4 are all connected to the lower electrode 21 in the piezoelectric unit 2. Alternatively, as shown in FIG. 19, at least one hollow-out mechanical part 4 in the at least two hollow-out mechanical parts 4 is connected to the middle electrode 24 in the piezoelectric unit 2, and another hollow-out mechanical part 4 is connected to the lower electrode 21 in the piezoelectric unit 2. Alternatively, as shown in FIG. 20, at least one hollow-out mechanical part 4 in the at least two hollow-out mechanical parts 4 is connected to the upper electrode 23 in the piezoelectric unit 2, and another hollow-out mechanical part 4 is connected to the lower electrode 21 in the piezoelectric unit 2. Alternatively, as shown in FIG. 21, the at least two hollow-out mechanical parts 4 are all connected to the middle electrode 24 in the piezoelectric unit 2. Alternatively, as shown in FIG. 22, the at least two hollow-out mechanical parts 4 are all connected to the upper electrode 23 in the piezoelectric unit 2. Alternatively, as shown in FIG. 23, at least one hollow-out mechanical part 4 in the at least two hollow-out mechanical parts 4 is connected to the upper electrode 23 in the piezoelectric unit 2, and another hollow-out mechanical part 4 is connected to the middle electrode 24 in the piezoelectric unit 2.

The following describes beneficial effects that can be achieved after the hollow-out mechanical part 4 is added to the piezoelectric acoustic sensor.

Figure 24:
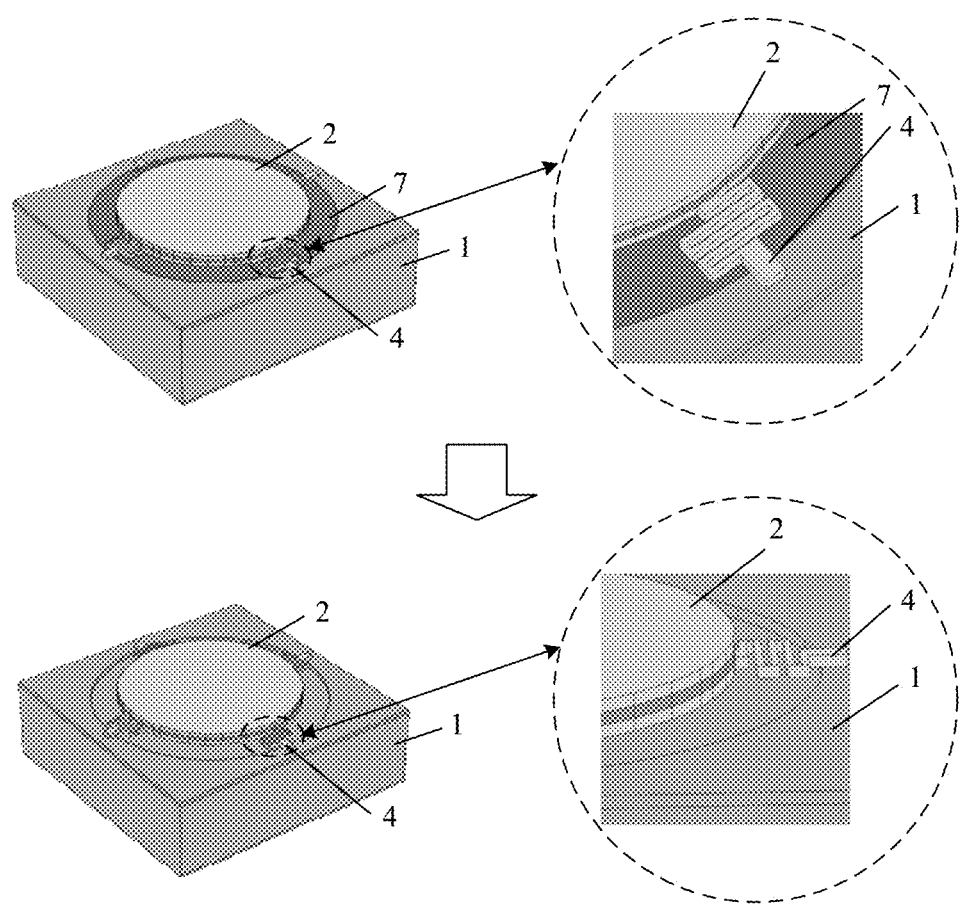
FIG. 24 is a schematic diagram of a process of removing a sacrificial layer according to an embodiment of this application.
Figure 25:
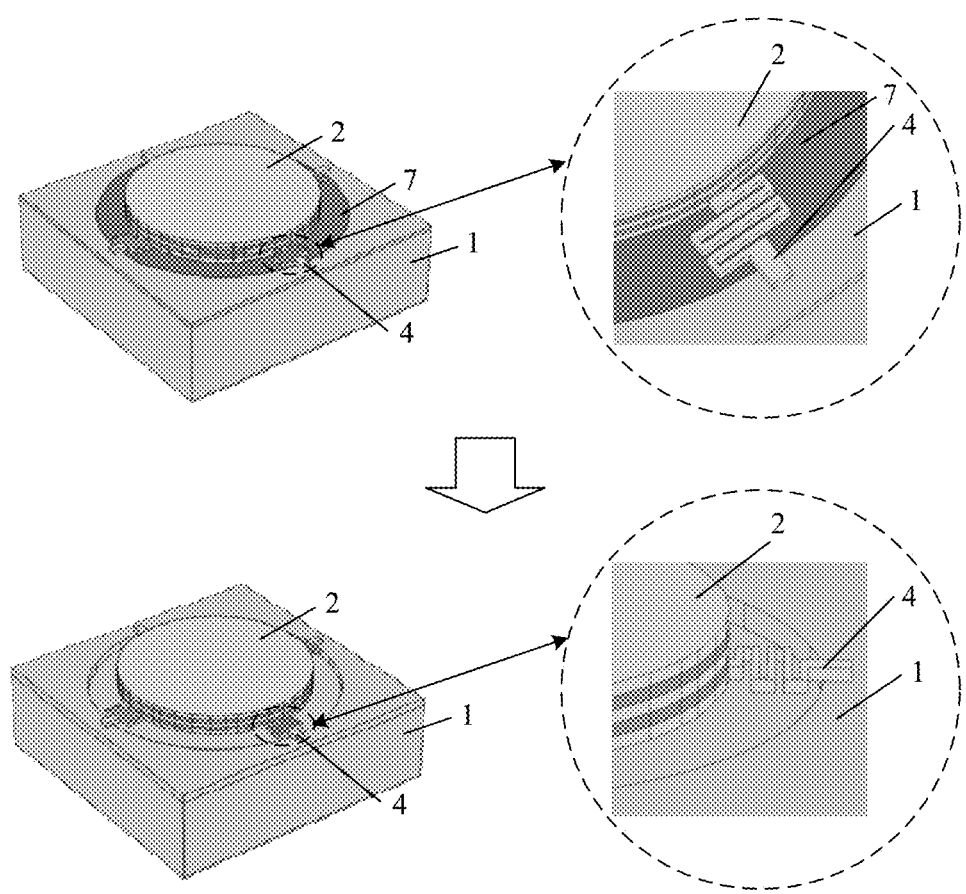
FIG. 25 is a schematic diagram of another process of removing a sacrificial layer according to an embodiment of this application.

As shown in FIG. 24 or FIG. 25, in a manufacturing process of the piezoelectric acoustic sensor, a sacrificial layer 7 is usually formed first, then the piezoelectric unit 2 is formed on the sacrificial layer 7, and then the sacrificial layer 7 is removed. In this case, on one hand, the hollow-out mechanical part 4 may have a mechanical connection function. In a process of removing the sacrificial layer 7 below the piezoelectric unit 2, the piezoelectric unit 2 may be connected to the anchoring unit 1 by using the hollow-out mechanical part 4. This may prevent the piezoelectric unit 2 from falling off in the process of removing the sacrificial layer 7. On the other hand, the hollow-out mechanical part 4 may have a stress release function. In the process of removing the sacrificial layer 7 below the piezoelectric unit 2, the low-rigidity and deformable hollow-out mechanical part 4 allows the piezoelectric unit 2 to move (for example, bend up and down or extend horizontally) through a change of a hollow-out gap, and a residual stress of the piezoelectric unit 2 is released by the deformable hollow-out mechanical part 4, to achieve zero residual stress. Since the residual stress of the piezoelectric unit 2 has been released, piezoelectric acoustic sensors of a same geometrical size have a same resonance frequency and sensitivity.

In this embodiment of this application, the piezoelectric acoustic sensor includes the anchoring unit 1, the piezoelectric unit 2, the support unit 3, and the hollow-out mechanical part 4. The back cavity 5 is formed in the anchoring unit 1. The piezoelectric unit 2 is configured to convert a sound signal that enters the back cavity 5 into an electrical signal. The support unit 3 covers the anchoring unit 1 and the piezoelectric unit 2. The hollow-out mechanical part 4 is connected between the anchoring unit 1 and the piezoelectric unit 2, and is embedded in the support unit 3. The residual stress of the piezoelectric unit 2 may be released by using the deformable hollow-out mechanical part 4 in a manufacturing process, to achieve zero residual stress. Therefore, this can avoid resonance frequency drift of the piezoelectric acoustic sensor, avoid sensitivity reduction of the piezoelectric acoustic sensor, and further help improve performance consistency of the piezoelectric acoustic sensor.

Figure 26:
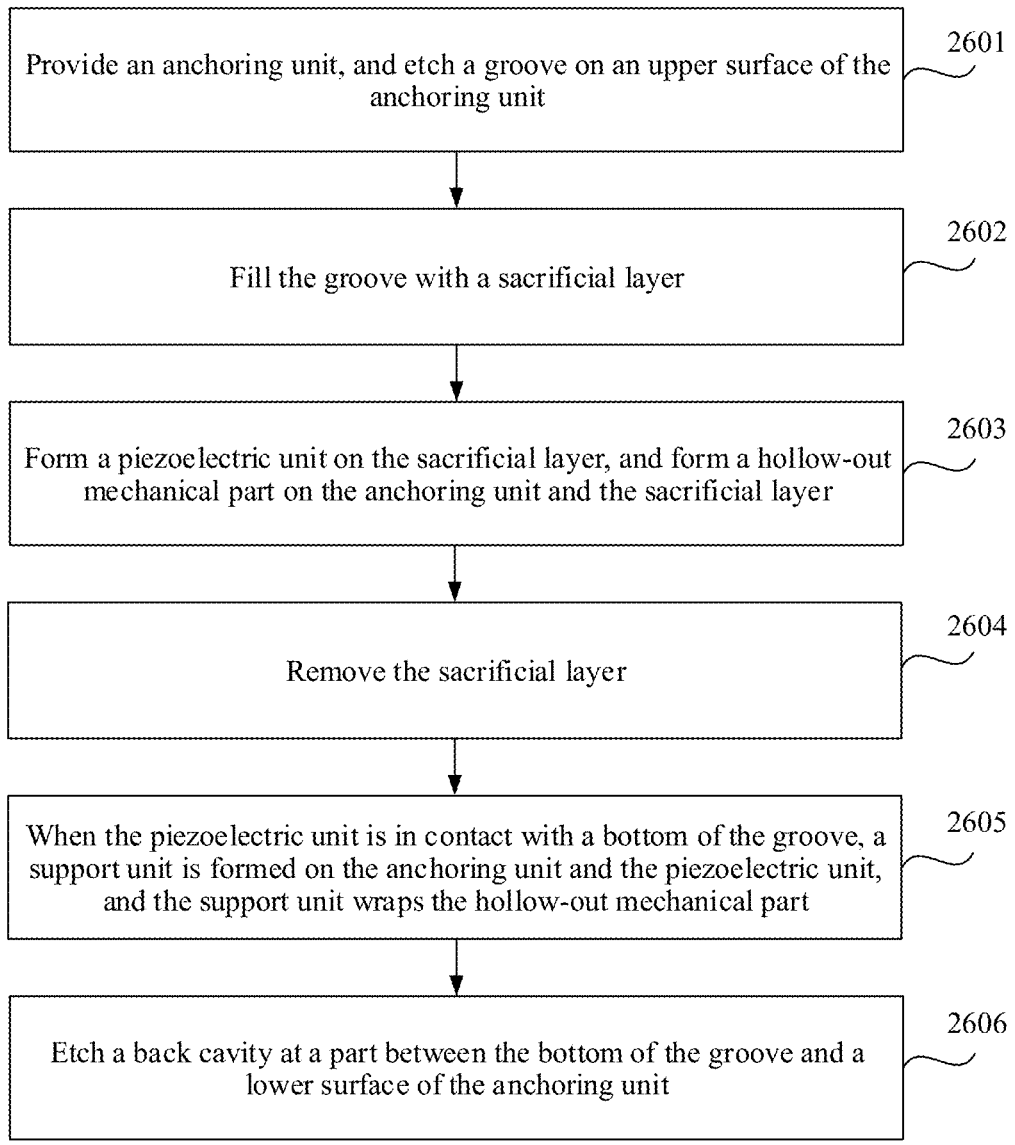
FIG. 26 is a flowchart of a method for manufacturing a piezoelectric acoustic sensor according to an embodiment of this application.

FIG. 26 is a flowchart of a method for manufacturing a piezoelectric acoustic sensor shown in FIG. 4 to FIG. 25 according to an embodiment of this application. Refer to FIG. 26. The method includes the following steps.

Step 2601: Provide an anchoring unit, and etch a groove on an upper surface of the anchoring unit.

Figure 27:
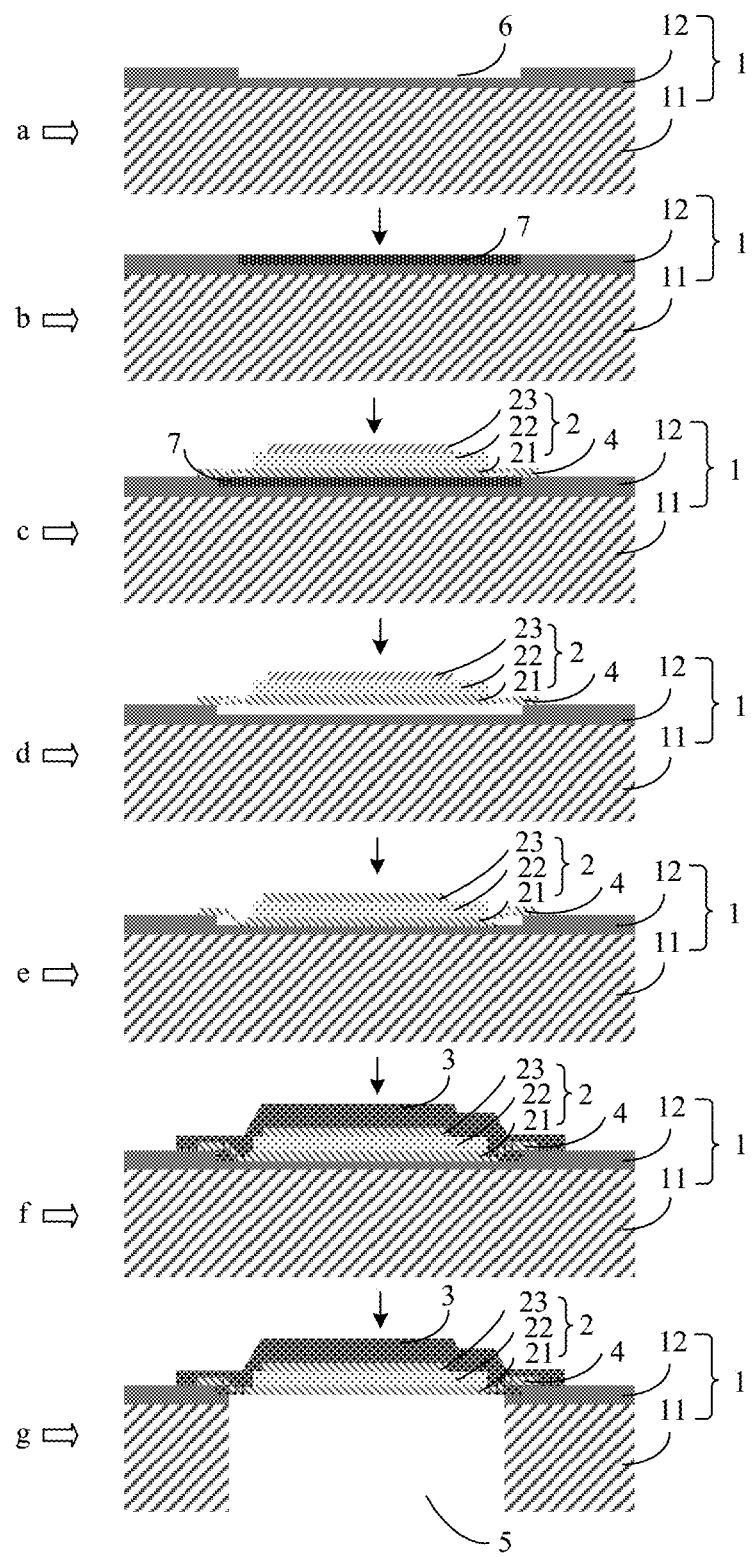
FIG. 27 is a schematic diagram of a manufacturing process of a piezoelectric acoustic sensor according to an embodiment of this application.
Figures 28A, 28B:
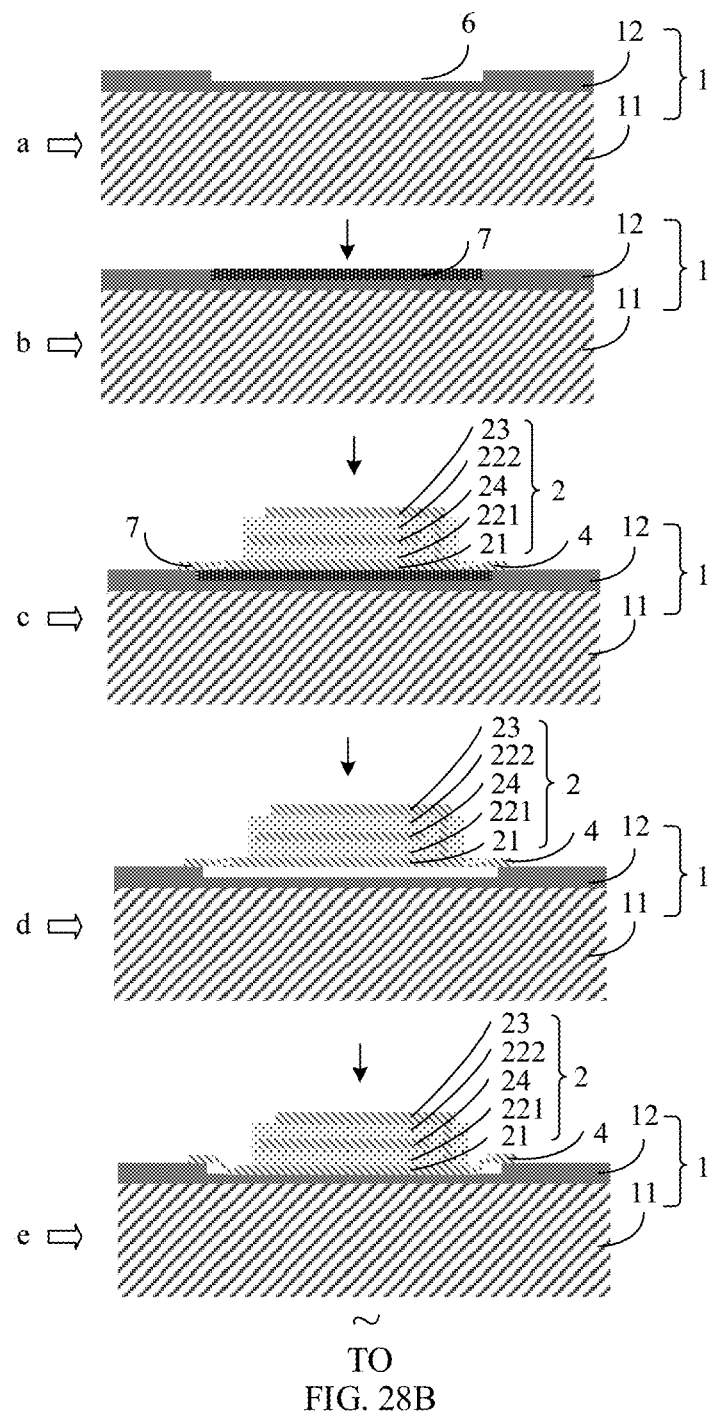
FIG. 28A and FIG. 28B are a schematic diagram of another manufacturing process of a piezoelectric acoustic sensor according to an embodiment of this application.
Figure 28B:
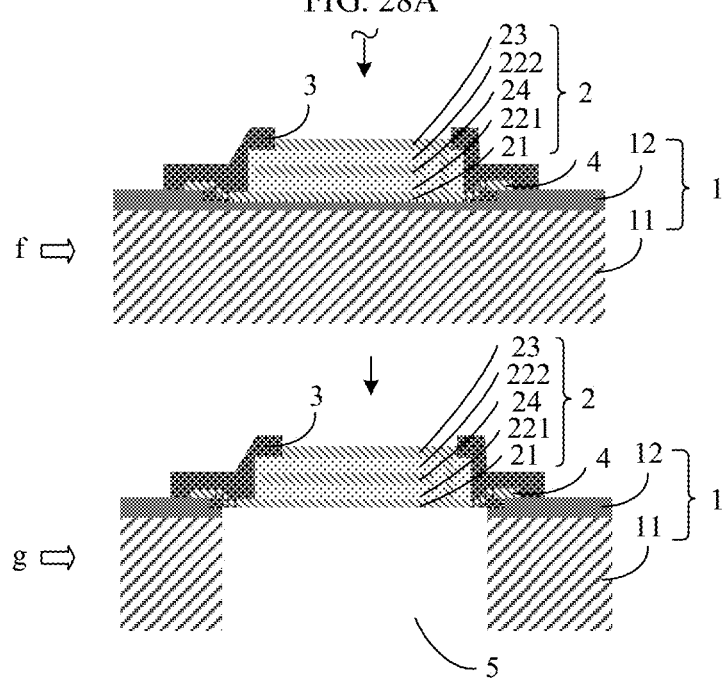

As shown in a in FIG. 27 or FIG. 28A, the anchoring unit 1 is provided, and then a groove 6 is etched on an upper surface of the anchoring unit 1.

The anchoring unit 1 is configured to fasten each component in the piezoelectric acoustic sensor, and another component in the piezoelectric acoustic sensor may be formed on the anchoring unit 1.

The anchoring unit 1 may include the substrate layer 11 and the insulation layer 12. In this case, when the anchoring unit 1 is provided, the substrate layer 11 may be first provided, and then the insulation layer 12 is formed on the substrate layer 11.

It should be noted that a material of the substrate layer 11 may be a material such as silicon, quartz, SOI, or SiC. A material of the insulation layer 12 may be silicon nitride or another dielectric material.

In addition, that the insulation layer 12 is formed on the substrate layer 11 may be depositing a material used to form the insulation layer 12 on an upper surface of the substrate layer 11 to obtain the insulation layer 12.

When the groove 6 is etched on the upper surface of the anchoring unit 1, a shape and a position of the groove 6 may be first defined on an upper surface of the insulation layer 12, to determine an area in which the groove 6 is located on the upper surface of the insulation layer 12. Then, an area other than the area in which the groove 6 is located on the upper surface of the insulation layer 12 is first protected by using a protective adhesive, and then the upper surface of the insulation layer 12 is etched to obtain the groove 6 on the upper surface of the insulation layer 12.

It should be noted that the shape and the position of the groove 6 may be defined by using a photoetching process, for example, by using a photoetching process such as electron beam exposure or optical exposure.

In addition, the protective adhesive may be an anti-etching adhesive, a polymethyl methacrylate (PMMA), or the like.

In addition, when the upper surface of the insulation layer 12 is etched, etching may be performed by using a process such as reactive-ion etching (RIE) or oxygen plasma etching.

Step 2602: Fill the groove with a sacrificial layer.

As shown in b in FIG. 27 or FIG. 28A, the sacrificial layer 7 is filled in the groove 6 in the upper surface of the anchoring unit 1. Specifically, a material used to form the sacrificial layer 7 may be deposited in the groove 6 on the upper surface of the anchoring unit 1 to obtain the sacrificial layer 7. A material of the sacrificial layer 7 may be a material that is easily corroded by a chemical etching agent, such as silicon dioxide or phosphorus-doped silicon oxide.

Step 2603: Form a piezoelectric unit on the sacrificial layer, and form a hollow-out mechanical part on the anchoring unit and the sacrificial layer.

As shown in c in FIG. 27 or FIG. 28A, the piezoelectric unit 2 is formed on the sacrificial layer 7, and the hollow-out mechanical part 4 is formed on the anchoring unit 1 and the sacrificial layer 7.

It should be noted that the piezoelectric unit 2 may be a piezoelectric stacked film, and may include the electrode and the piezoelectric material. A material of the electrode may be molybdenum, titanium, platinum, aluminum, or the like, and the piezoelectric material may be aluminum nitride, aluminum scandium nitride, lead zirconate titanate, or the like. The piezoelectric unit 2 may convert mechanical motion into an electrical signal. Specifically, when a sound signal causes the piezoelectric material to vibrate, an electric potential difference is generated between an upper electrode and a lower electrode in a stress-concentrated area in the piezoelectric material. In this way, the sound signal may be converted into the electrical signal for extraction.

In addition, an area of a lower surface of the piezoelectric unit 2 is less than an area of an upper surface of the sacrificial layer 7. In other words, the piezoelectric unit 2 is completely located on the upper surface of the sacrificial layer 7.

When the piezoelectric unit 2 is formed on the sacrificial layer 7, a shape and a position of the piezoelectric unit 2 may be defined on the upper surface of the sacrificial layer 7 to determine an area in which the piezoelectric unit 2 is located on the upper surface of the sacrificial layer 7. Then, a material used to form the piezoelectric unit 2 is deposited on the area in which the piezoelectric unit 2 is located on the upper surface of the sacrificial layer 7 to obtain the piezoelectric unit 2.

It should be noted that the shape and the position of the piezoelectric unit 2 may be defined by using a photoetching process, for example, by using a photoetching process such as electron beam exposure or optical exposure.

In a possible implementation, as shown in FIG. 27, the piezoelectric unit 2 may be a single piezoelectric wafer, and the piezoelectric unit 2 may include the lower electrode 21, the piezoelectric material 22, and the upper electrode 23. In this case, when the piezoelectric unit 2 is formed on the sacrificial layer 7, the lower electrode 21 may be formed on the sacrificial layer 7, the piezoelectric material 22 may be formed on the lower electrode 21, and the upper electrode 23 may be formed on the piezoelectric material 22.

In other words, a material used to form the lower electrode 21 may be deposited on the upper surface of the sacrificial layer 7 to obtain the lower electrode 21, and then the piezoelectric material 22 is deposited on the upper surface of the lower electrode 21. Finally, a material used to form the upper electrode 23 is deposited on an upper surface of the piezoelectric material 22 to obtain the upper electrode 23.

In another possible implementation, as shown in FIG. 28A and FIG. 28B, the piezoelectric unit 2 may be a double piezoelectric wafer, and the piezoelectric unit 2 may include the lower electrode 21, the first piezoelectric material 221, the middle electrode 24, the second piezoelectric material 222, and the upper electrode 23. In this case, when the piezoelectric unit 2 is formed on the sacrificial layer 7, the lower electrode 21 may be formed on the sacrificial layer 7, the first piezoelectric material 221 may be formed on the lower electrode 21, the middle electrode 24 may be formed on the first piezoelectric material 221, the second piezoelectric material 222 is formed on the middle electrode 24, and the upper electrode 23 is formed on the second piezoelectric material 222.

In other words, a material used to form the lower electrode 21 may be deposited on the upper surface of the sacrificial layer 7 to obtain the lower electrode 21, and then the first piezoelectric material 221 is deposited on the upper surface of the lower electrode 21. A material used to form the middle electrode 24 is deposited on an upper surface of the first piezoelectric material 221 to obtain the middle electrode 24, then the second piezoelectric material 222 is deposited on an upper surface of the middle electrode 24, and a material used to form the upper electrode 23 is deposited on an upper surface of the second piezoelectric material 222 to obtain the upper electrode 23.

It should be noted that the hollow-out mechanical part 4 is a mechanical structure in which some materials are removed, and has low rigidity and is easy to deform. A shape of the hollow-out mechanical part 4 may be set based on a use requirement. For example, the shape of the hollow-out mechanical part 4 may be a bent shape, a hollow shape, a grid shape, or the like.

In addition, the hollow-out mechanical part 4 is connected between the anchoring unit 1 and the piezoelectric unit 2. In other words, a first end of the hollow-out mechanical part 4 may be fastened to an upper surface of the anchoring unit 1 (that is, an upper surface of the insulation layer 12), and a second end of the hollow-out mechanical part 4 may be connected to the piezoelectric unit 2.

In addition, the hollow-out mechanical part 4 may have a stress release function. A quantity of hollow-out mechanical parts 4 may be set based on a use requirement. To improve a stress release effect, the quantity of hollow-out mechanical parts 4 may be greater than or equal to 2. Further, at least two hollow-out mechanical parts 4 may be evenly distributed around the piezoelectric unit 2.

The hollow-out mechanical part 4 may be connected to at least one of the electrode or the piezoelectric material in the piezoelectric unit 2. In addition, when the hollow-out mechanical part 4 is connected to the electrode in the piezoelectric unit 2, the hollow-out mechanical part 4 and the electrode to which the hollow-out mechanical part 4 is connected may use a same material. When the hollow-out mechanical part 4 is connected to the piezoelectric material in the piezoelectric unit 2, the hollow-out mechanical part 4 and the piezoelectric material to which the hollow-out mechanical part 4 is connected may use a same material. When the hollow-out mechanical part 4 is separately connected to the electrode and the piezoelectric material in the piezoelectric unit 2, that is, when one part of the hollow-out mechanical part 4 is connected to the electrode in the piezoelectric unit 2 and another part is connected to the piezoelectric material in the piezoelectric unit 2, a part of the hollow-out mechanical part 4 and the electrode to which the hollow-out mechanical part 4 is connected may use a same material, and the another part of the hollow-out mechanical part 4 and the piezoelectric material to which the hollow-out mechanical part 4 is connected may use a same material. In this case, the hollow-out mechanical part 4 may be a multi-layer structure, each layer of the hollow-out mechanical part 4 may be connected to the electrode or the piezoelectric material, and the electrode or the piezoelectric material connected to each layer of the hollow-out mechanical part 4 uses a same material.

In this way, when the electrode or the piezoelectric material in the piezoelectric unit 2 is manufactured, the hollow-out mechanical part 4 to which the electrode or the piezoelectric material is connected may also be manufactured. This simplifies a manufacturing process, and saves manufacturing costs and manufacturing time.

In a possible implementation, in the piezoelectric unit 2 shown in FIG. 27, that is, when the piezoelectric unit 2 includes three parts: the lower electrode 21, the piezoelectric material 22, and the upper electrode 23, the hollow-out mechanical part 4 may be connected to any one of the three parts. In addition, when a quantity of hollow-out mechanical parts 4 is greater than or equal to 2, at least two hollow-out mechanical parts 4 may be connected to one part of the piezoelectric unit 2, or each hollow-out mechanical part 4 may be connected to a different part of the piezoelectric unit 2.

For example, the at least two hollow-out mechanical parts 4 are all connected to the lower electrode 21 in the piezoelectric unit 2. Alternatively, at least one hollow-out mechanical part 4 in the at least two hollow-out mechanical parts 4 is connected to the upper electrode 23 in the piezoelectric unit 2, and another hollow-out mechanical part 4 is connected to the lower electrode 21 in the piezoelectric unit 2.

In another possible implementation, in the piezoelectric unit 2 shown in FIG. 28A and FIG. 28B, that is, when the piezoelectric unit 2 includes five parts: the lower electrode 21, the first piezoelectric material 221, the middle electrode 24, the second piezoelectric material 222, and the upper electrode 23, the hollow-out mechanical part 4 may be connected to any one of the five parts. In addition, when a quantity of hollow-out mechanical parts 4 is greater than or equal to 2, at least two hollow-out mechanical parts 4 may be connected to one part of the piezoelectric unit 2, or each hollow-out mechanical part 4 may be connected to a different part of the piezoelectric unit 2.

For example, the at least two hollow-out mechanical parts 4 are all connected to the lower electrode 21 in the piezoelectric unit 2. Alternatively, at least one hollow-out mechanical part 4 in the at least two hollow-out mechanical parts 4 is connected to the middle electrode 24 in the piezoelectric unit 2, and another hollow-out mechanical part 4 is connected to the lower electrode 21 in the piezoelectric unit 2. Alternatively, at least one hollow-out mechanical part 4 in the at least two hollow-out mechanical parts 4 is connected to the upper electrode 23 in the piezoelectric unit 2, and another hollow-out mechanical part 4 is connected to the lower electrode 21 in the piezoelectric unit 2. Alternatively, the at least two hollow-out mechanical parts 4 are all connected to the middle electrode 24 in the piezoelectric unit 2. Alternatively, the at least two hollow-out mechanical parts 4 are all connected to the upper electrode 23 in the piezoelectric unit 2. Alternatively, at least one hollow-out mechanical part 4 in the at least two hollow-out mechanical parts 4 is connected to the upper electrode 23 in the piezoelectric unit 2, and another hollow-out mechanical part 4 is connected to the middle electrode 24 in the piezoelectric unit 2.

When the hollow-out mechanical part 4 is formed on the anchoring unit 1 and the sacrificial layer 7, a shape and a position of the hollow-out mechanical part 4 may be defined on the upper surface of the anchoring unit 1 and the upper surface of the sacrificial layer 7, to determine an area in which the hollow-out mechanical part 4 is located on the upper surface of the anchoring unit 1 and the upper surface of the sacrificial layer 7. Then, a material used to form the hollow-out mechanical part 4 is deposited in the area in which the hollow-out mechanical part 4 is located to obtain the hollow-out mechanical part 4.

It should be noted that the shape and the position of the hollow-out mechanical part 4 may be defined by using a photoetching process, for example, by using a photoetching process such as electron beam exposure or optical exposure.

Step 2604: Remove the sacrificial layer.

As shown in d in FIG. 27 or FIG. 28A, the sacrificial layer 7 may be removed. When the sacrificial layer 7 is removed, the sacrificial layer 7 may be corroded by using a chemical etching agent. For example, when a material of the sacrificial layer 7 is silicon dioxide, the silicon dioxide may be etched with liquid hydrofluoric acid to remove the silicon dioxide.

In this case, on one hand, the hollow-out mechanical part 4 may have a mechanical connection function. In a process of removing the sacrificial layer 7 below the piezoelectric unit 2, the piezoelectric unit 2 may be connected to the anchoring unit 1 by using the hollow-out mechanical part 4. This may prevent the piezoelectric unit 2 from falling off in the process of removing the sacrificial layer 7. In this case, the piezoelectric unit 2 may be suspended above the groove 6 by using the hollow-out mechanical part 4. On the other hand, the hollow-out mechanical part 4 may have a stress release function. In the process of removing the sacrificial layer 7 below the piezoelectric unit 2, the low-rigidity and deformable hollow-out mechanical part 4 allows the piezoelectric unit 2 to move (for example, bend up and down or extend horizontally) through a change of a hollow-out gap, and a residual stress of the piezoelectric unit 2 is released by the deformable hollow-out mechanical part 4, to achieve zero residual stress. Since the residual stress of the piezoelectric unit 2 has been released, piezoelectric acoustic sensors of a same geometrical size that are finally fabricated have a same resonance frequency and sensitivity.

Because the piezoelectric unit 2 is completely located on the sacrificial layer 7 in the foregoing steps, after the sacrificial layer 7 is removed, and after the residual stress of the piezoelectric unit 2 is released and each device (including the anchoring unit 1, the piezoelectric unit 2, and the hollow-out mechanical part 4) is dried, due to gravity, the piezoelectric unit 2 drops into the groove 6 in which the original sacrificial layer 7 is located and is in contact with a bottom of the groove 6. In other words, after the residual stress of the piezoelectric unit 2 is released and each device is dried, the piezoelectric unit 2 is attached to a surface of the anchoring unit 1.

Step 2605: When the piezoelectric unit is in contact with a bottom of the groove, a support unit is formed on the anchoring unit and the piezoelectric unit, and the support unit wraps the hollow-out mechanical part.

As shown in e in FIG. 27 or FIG. 28A, when the piezoelectric unit 2 is in contact with the bottom of the groove 6, the support unit 3 may be formed on the anchoring unit 1 and the piezoelectric unit 2. In this case, the support unit 3 wraps the hollow-out mechanical part 4.

It should be noted that the support unit 3 is configured to fasten positions of the anchoring unit 1, the hollow-out mechanical part 4, and the piezoelectric unit 2, to enhance mechanical strength of the finally manufactured piezoelectric acoustic sensor. A material of the support unit 3 may be polycrystalline silicon, silicon nitride, silicon dioxide, or the like.

In addition, because the hollow-out mechanical part 4 is connected between the anchoring unit 1 and the piezoelectric unit 2, after the support unit 3 is formed on the anchoring unit 1 and the piezoelectric unit 2, the support unit 3 wraps the hollow-out mechanical part 4. In other words, the support unit 3 covers the anchoring unit 1 and the piezoelectric unit 2, and the hollow-out mechanical part 4 is embedded in the support unit 3. In this way, the support unit 3 implements fastening positions of the anchoring unit 1, the hollow-out mechanical part 4, and the piezoelectric unit 2.

In addition, the support unit 3 wraps the hollow-out mechanical part 4, that is, the support unit 3 fills a hollow-out gap in the hollow-out mechanical part 4. In this way, an intrinsic resonance frequency of a finally manufactured piezoelectric acoustic sensor may be adjusted, sound leakage caused by the hollow-out gap is reduced, and low-frequency response performance of the piezoelectric acoustic sensor is improved.

In a possible implementation, in the piezoelectric unit 2 shown in FIG. 27, that is, when the piezoelectric unit 2 includes the lower electrode 21, the piezoelectric material 22, and the upper electrode 23, the support unit 3 may be directly deposited on the upper surface of the anchoring unit 1 and the upper surface of the piezoelectric unit 2. The deposited support unit 3 wraps the hollow-out mechanical part 4.

In this case, the upper surface of the piezoelectric unit 2 is completely covered with the support unit 3. In this way, existence of the support unit 3 may enable a neutral axis of the piezoelectric unit 2 to be far away from a center of the piezoelectric unit 2 (that is, far away from the piezoelectric material 22), so that charge output and sensitivity of the finally manufactured piezoelectric acoustic sensor can be effectively improved.

When the support unit 3 is deposited on the upper surface of the anchoring unit 1 and the upper surface of the piezoelectric unit 2, a shape and a position of the support unit 3 may be first defined on the upper surface of the anchoring unit 1 and the upper surface of the piezoelectric unit 2, to determine an area in which the support unit 3 is located on the upper surface of the anchoring unit 1 and the upper surface of the piezoelectric unit 2. Then, a material used to form the support unit 3 is deposited on the area in which the support unit 3 is located, to obtain the support unit 3.

It should be noted that the shape and the position of the support unit 3 may be defined by using a photoetching process, for example, by using a photoetching process such as electron beam exposure or optical exposure.

In another possible implementation, in the piezoelectric unit 2 shown in FIG. 28A and FIG. 28B, that is, when the piezoelectric unit 2 includes the lower electrode 21, the first piezoelectric material 221, the middle electrode 24, the second piezoelectric material 222, and the upper electrode 23, the support unit 3 may be first deposited on the upper surface of the anchoring unit 1 and the upper surface of the piezoelectric unit 2. The deposited support unit 3 wraps the hollow-out mechanical part 4, and then at least a part of the support unit 3 deposited on the upper surface of the piezoelectric unit 2 is removed.

In this case, the upper surface of the piezoelectric unit 2 is partially covered with the support unit 3. For example, a part that is of the support unit 3 and that is deposited on the central part of the upper surface of the piezoelectric unit 2 may be removed. In this case, the support unit 3 is covered with an edge part of the upper surface of the piezoelectric unit 2, and the support unit 3 is not covered with the central part of the upper surface of the piezoelectric unit 2. In other words, a central area of the part above the piezoelectric unit 2 in the support unit 3 is hollowed out. In this way, it may be ensured that a neutral axis of the piezoelectric unit 2 is located in the middle electrode 24 of the piezoelectric unit 2, so that charge output and sensitivity of the finally manufactured piezoelectric acoustic sensor are not affected.

When at least one part of the support unit 3 deposited on the upper surface of the piezoelectric unit 2 is removed, a shape and a position of a target part may be first defined on the upper surface of the support unit 3, to determine an area in which the target part is located on the upper surface of the support unit 3. The target part is at least a part deposited on the upper surface of the piezoelectric unit 2. Then, an area other than the area in which the target part is located on the upper surface of the support unit 3 is first protected by using a protective adhesive, and then the upper surface of the support unit 3 is etched to remove the target part from the support unit 3.

It should be noted that the shape and the position of the target part may be defined by using a photoetching process, for example, by using a photoetching process such as electron beam exposure or optical exposure.

In addition, when the upper surface of the support unit 3 is etched, etching may be performed by using a process such as reactive-ion etching or oxygen plasma etching.

Step 2606: Etch a back cavity at a part between the bottom of the groove and a lower surface of the anchoring unit.

As shown in fin FIG. 27 or FIG. 28B, the back cavity 5 is etched at a part between the bottom of the groove 6 and the lower surface of the anchoring unit 1. The back cavity 5 is a sound inlet hole. In this case, the piezoelectric unit 2 is suspended above the sound inlet hole, and may sense a sound.

In this embodiment of this application, an anchoring unit is provided, a groove is etched on an upper surface of the anchoring unit, and then a sacrificial layer is filled in the groove. A piezoelectric unit is formed on the sacrificial layer, a hollow-out mechanical part is formed on the anchoring unit and the sacrificial layer, and the hollow-out mechanical part is connected between the anchoring unit and the piezoelectric unit. Then, the sacrificial layer is removed. When the piezoelectric unit is in contact with a bottom of the groove, a support unit is formed on the anchoring unit and the piezoelectric unit, and the support unit wraps the hollow-out mechanical part. Finally, a back cavity is etched at a part between the bottom of the groove and a lower surface of the anchoring unit to obtain the piezoelectric acoustic sensor. In this manufacturing process, a residual stress of the piezoelectric unit may be released by using the deformable hollow-out mechanical part, to achieve zero residual stress. Therefore, this can avoid resonance frequency drift of the piezoelectric acoustic sensor, avoid sensitivity reduction of the piezoelectric acoustic sensor, and further help improve performance consistency of the piezoelectric acoustic sensor.

The foregoing description is embodiments provided in this application, but is not intended to limit this application. Any modification, equivalent replacement, or improvement made without departing from the spirit and principle of this application should fall within the protection scope of this application.

What is claimed is:

1. A piezoelectric acoustic sensor, wherein the piezoelectric acoustic sensor comprises:
   an anchoring unit;
   a piezoelectric unit;
   a support unit; and a hollow-out mechanical part;
wherein:
a back cavity is formed in the anchoring unit;
the piezoelectric unit is configured to convert a sound signal that enters the back cavity into an electrical signal;
the support unit covers the anchoring unit and the piezoelectric unit; and
the hollow-out mechanical part is connected between the anchoring unit and the piezoelectric unit, and is embedded in the support unit, wherein the support unit fills a hollow-out gap in the hollow-out mechanical part.

2. The piezoelectric acoustic sensor according to claim 1, wherein the piezoelectric unit comprises an electrode and a piezoelectric material, and the hollow-out mechanical part is connected to at least one of the electrode or the piezoelectric material.

3. The piezoelectric acoustic sensor according to claim 2, wherein:
the hollow-out mechanical part is connected to the electrode, and the hollow-out mechanical part and the electrode use a same material;
the hollow-out mechanical part is connected to the piezoelectric material, and the hollow-out mechanical part and the piezoelectric material use a same material; or
the hollow-out mechanical part is separately connected to the electrode and the piezoelectric material, a part of the hollow-out mechanical part and the electrode use a same material, and another part of the hollow-out mechanical part and the piezoelectric material use a same material.

4. The piezoelectric acoustic sensor according to claim 1, wherein:
the piezoelectric unit comprises a lower electrode, a piezoelectric material, and an upper electrode;
the piezoelectric material is located between the lower electrode and the upper electrode; and
an upper surface of the piezoelectric unit is completely covered with the support unit.

5. The piezoelectric acoustic sensor according to claim 1, wherein:
the piezoelectric unit comprises a lower electrode, a first piezoelectric material, a middle electrode, a second piezoelectric material, and an upper electrode;
the first piezoelectric material is located between the lower electrode and the middle electrode;
the second piezoelectric material is located between the middle electrode and the upper electrode; and
an upper surface of the piezoelectric unit is partially covered with the support unit.

6. The piezoelectric acoustic sensor according to claim 1, wherein a quantity of hollow-out mechanical parts is greater than or equal to 2.

7. The piezoelectric acoustic sensor according to claim 1, wherein a shape of the hollow-out mechanical part is a bent shape, a hollow shape, or a grid shape.

8. The piezoelectric acoustic sensor according to claim 1, wherein the anchoring unit comprises a substrate layer and an insulation layer, and the insulation layer covers the substrate layer.

9. A method for manufacturing a piezoelectric acoustic sensor, comprising:
providing an anchoring unit;
etching a groove on an upper surface of the anchoring unit;
filling the groove with a sacrificial layer;
forming a piezoelectric unit on the sacrificial layer, and forming a hollow-out mechanical part on the anchoring unit and the sacrificial layer, wherein an area of a lower surface of the piezoelectric unit is less than an area of an upper surface of the sacrificial layer, and the hollow-out mechanical part is connected between the anchoring unit and the piezoelectric unit;
removing the sacrificial layer;
when the piezoelectric unit is in contact with a bottom of the groove, forming a support unit on the anchoring unit and the piezoelectric unit, wherein the support unit wraps the hollow-out mechanical part; and
etching a back cavity at a part between the bottom of the groove and a lower surface of the anchoring unit.

10. The method according to claim 9, wherein the piezoelectric unit comprises an electrode and a piezoelectric material, and the hollow-out mechanical part is connected to at least one of the electrode and the piezoelectric material.

11. The method according to claim 10, wherein:
the hollow-out mechanical part is connected to the electrode, and the hollow-out mechanical part and the electrode use a same material;
the hollow-out mechanical part is connected to the piezoelectric material, and the hollow-out mechanical part and the piezoelectric material use a same material; or
the hollow-out mechanical part is separately connected to the electrode and the piezoelectric material, a part of the hollow-out mechanical part and the electrode use a same material, and another part of the hollow-out mechanical part and the piezoelectric material use a same material.

12. The method according to claim 10, wherein:
the forming a piezoelectric unit on the sacrificial layer comprises:
forming a lower electrode above the sacrificial layer;
forming the piezoelectric material on the lower electrode; and
forming an upper electrode on the piezoelectric material; and
the forming a support unit on the anchoring unit and the piezoelectric unit comprises depositing the support unit on the upper surface of the anchoring unit and an upper surface of the piezoelectric unit.

13. The method according to claim 10, wherein:
the forming a piezoelectric unit on the sacrificial layer comprises:
forming a lower electrode above the sacrificial layer;
forming a first piezoelectric material on the lower electrode;
forming a middle electrode on the first piezoelectric material;
forming a second piezoelectric material on the middle electrode; and
forming an upper electrode on the second piezoelectric material; and
the forming a support unit on the anchoring unit and the piezoelectric unit comprises:
depositing the support unit on the upper surface of the anchoring unit and an upper surface of the piezoelectric unit; and
removing at least a part of the support unit deposited on the upper surface of the piezoelectric unit.

14. The method according to claim 9, wherein a quantity of hollow-out mechanical parts is greater than or equal to 2.

15. The method according to claim 9, wherein a shape of the hollow-out mechanical part is a bent shape, a hollow shape, or a grid shape.

16. The method according to claim 9, wherein the providing an anchoring unit comprises:
provibing a substrate layer; and
forming an insulation layer on the substrate layer.

17. A piezoelectric acoustic sensor, wherein the piezoelectric acoustic sensor comprises:
an anchoring unit;
a piezoelectric unit;
a support unit; and
a hollow-out mechanical part;
wherein:
a back cavity is formed in the anchoring unit;
the piezoelectric unit is configured to convert a sound signal that enters the back cavity into an electrical signal;
the support unit covers the anchoring unit and the piezoelectric unit;
the hollow-out mechanical part is connected between the anchoring unit and the piezoelectric unit, and is embedded in the support unit; and
the piezoelectric unit comprises an electrode and a piezoelectric material, and the hollow-out mechanical part is connected to at least one of the electrode or the piezoelectric material, wherein:
the hollow-out mechanical part is connected to the electrode, and the hollow-out mechanical part and the electrode use a same material;
the hollow-out mechanical part is connected to the piezoelectric material, and the hollow-out mechanical part and the piezoelectric material use a same material; or
the hollow-out mechanical part is separately connected to the electrode and the piezoelectric material, a part of the hollow-out mechanical part and the electrode use a same material, and another part of the hollow-out mechanical part and the piezoelectric material use a same material.

18. The piezoelectric acoustic sensor according to claim 17, wherein:
the piezoelectric unit comprises a lower electrode, a piezoelectric material, and an upper electrode;
the piezoelectric material is located between the lower electrode and the upper electrode; and
an upper surface of the piezoelectric unit is completely covered with the support unit.

19. The piezoelectric acoustic sensor according to claim 17, wherein:
the piezoelectric unit comprises a lower electrode, a first piezoelectric material, a middle electrode, a second piezoelectric material, and an upper electrode;
the first piezoelectric material is located between the lower electrode and the middle electrode;
the second piezoelectric material is located between the middle electrode and the upper electrode; and
an upper surface of the piezoelectric unit is partially covered with the support unit.

20. The piezoelectric acoustic sensor according to claim 17, wherein a quantity of hollow-out mechanical parts is greater than or equal to 2.

21. The piezoelectric acoustic sensor according to claim 17, wherein a shape of the hollow-out mechanical part is a bent shape, a hollow shape, or a grid shape.

22. The piezoelectric acoustic sensor according to claim 17, wherein the anchoring unit comprises a substrate layer and an insulation layer, and the insulation layer covers the substrate layer.

* * * * *